March 12, 1963 N. T. WATTERS 3,081,377

SECRECY COMMUNICATION

Filed May 3, 1960 7 Sheets-Sheet 1

INVENTOR
Norman T. Watters
By James E. Tracy
Atty.

INVENTOR.
Norman T. Watters
BY James E. Tracy
Atty.

March 12, 1963 N. T. WATTERS 3,081,377

SECRECY COMMUNICATION

Filed May 3, 1960 7 Sheets-Sheet 3

INVENTOR.
Norman T. Watters
BY James E. Tracy
Atty.

INVENTOR.
Norman T. Watters
BY James E. Tracy
Atty.

INVENTOR.
Norman T. Watters
BY James E. Tracy
Atty.

INVENTOR.
Norman T. Watters
BY James E. Tracy
Atty.

INVENTOR.
Norman T. Watters
BY James E. Tracy
Atty.

3,081,377
Patented Mar. 12, 1963

3,081,377

SECRECY COMMUNICATION

Norman T. Watters, Elmhurst, Ill., assignor to Zenith Radio Corporation, a corporation of Delaware Filed May 3, 1960, Ser. No. 26,545
18 Claims. (Cl. 178—5.1)

This invention relates to a secrecy communication receiver, and method of operating the same, of the type including adjustable decoding apparatus which must be adjusted in a particular prescribed manner before decoding or unscrambling may be accomplished. More particularly, the invention pertains to a secrecy communication receiver wherein a correlation test is made between the instantaneous adjustment of the decoding apparatus and a given code pattern which represents the condition to which it should be adjusted to achieve decoding. In other words, the invention provides for an examination of the decoding apparatus to determine if that apparatus is actually positioned or adjusted properly so that decoding may take place. The arrangement of the present invention is particularly attractive when incorporated in a subscription television system and will be described in such an environment.

In a subscription television service it is expedient to provide each of the subscribers with decoding apparatus having a number of multi-position code-determining or signal-translating elements that are to be adjusted relative to one another in accordance with a pattern, preferably before the commencement of each program. The particular pattern of adjustment of the elements for any program is made known to subscribers wishing to subscribe thereto, and a charge assessment is levied on the basis of such information conveyed. Systems of this general type are disclosed and claimed in, for example, Patents 2,843,656, issued July 15, 1958; 2,823,252, issued February 11, 1958; 2,816,156, issued December 10, 1957; 2,910,526 issued October 27, 1959; 2,923,764, issued February 2, 1960; and 2,852,598, issued September 16, 1958, all of which are assigned to the present assignee.

It will be appreciated that there may be a temptation for unauthorized persons, not apprised of the adjustment pattern for a particular program, to employ a trial and error method of manipulating the code-determining elements in an attempt to reach the correct setting. Of course, if this effort should be successful, the individual would succeed in avoiding the obligation to make payment for enjoying the subscription program. Trial and error adjustment of the decoder is a difficult task but it is suspected that the burden may possibly be eased through the observation of changes occasioned in the reproduced image as the trial and error process is pursued step-by-step. However, this type of cheating may be made even more difficult by arranging that no image shall appear on the screen unless and until the decoding apparatus has been conditioned as required to effect complete picture decoding. It is also advantageous to insure that the decoding of the audio portion of the telecast shall not occur until the decoding apparatus is properly adjusted. Rendering the audio channel completely inoperative until the receiver has been adjusted correctly permits the use of a relatively simple sound scrambling technique.

In copending applications Serial Nos. 823,463, filed June 29, 1959, now Patent No. 3,011,016, issued November 28, 1961, in the name of Erwin M. Roschke, and 823,401, also filed June 29, 1959, and issued October 25, 1960 as Patent 2,957,939, in the name of George V. Morris, both of which applications are assigned to the present assignee, various arrangements are disclosed and claimed for achieving such objectives. In accordance with the disclosures of these copending applications, the correlation status between a given code schedule or pattern and the instantaneous adjustment of the adjustable code-determining elements is tested to determine if the subscriber has properly positioned his code-determining elements; if he has, decoding of the telecast is permitted but not otherwise. If desired a use or recording mechanism is concurrently actuated to record the fact that the subscriber has received and decoded the subscription program.

In the subscription system specifically disclosed in the Roschke application, during each field-retrace interval a combination of randomly occuring code signal components are permuted through a permuting mechanism or translator, comprising a plurality of code-determining elements, to a series of input circuits of a mode-determining circuit in the form of a bi-stable multivibrator. Because of the random occurrence of the code signal components, the bi-stable multivibrator is actuated between its two stable conditions at random to produce a rectangular shaped decoding or control signal having maximum and minimum amplitude levels for controlling the operation of the video decoder. Each time the decoding signal undergoes an amplitude excursion, a mode change is made in the system. The mode established at the termination of each combination of code components ensues for the entire succeeding field-trace interval. Because the bi-stable multivibrator may be established in only two operating conditions, the Roschke system may be thought of as having two operating states.

A correlation signal component, whose occurrence is governed by the code schedule or mode-changing pattern of the telecast, is compared in a comparison circuit with the rectangular shaped decoding signal. If the wave forms of the signals compared exhibit a particular relationship, a multi-condition mechanism, in the form of a flip-flop circuit or bi-stable multivibrator, is triggered or actuated to a predetermined one of its two operating conditions, indicating the fact that the adjustable code-determining elements of the permuter or translator are properly adjusted. On the other hand, when there is incorrect correlation between the code schedule and the instantaneous adjustment of the code-determining elements, comparison of the wave forms results in a signal which actuates the multi-condition mechanism or correlator flip-flop to its other operating condition which indicates the fact that the adjustable code-determining elements are not correctly positioned. The output of the correlator flip-flop is employed to control the operation of the video and/or audio channels and/or a use meter.

While the Roschke approach is quite attractive in that it successfully determines the correlation status between the instantaneous adjustment of code-determining elements and a predetermined adjustment to which they should be positioned when it is desired to subscribe to a program, it is remotely possible that the correlator flip-flop or multi-condition mechanism will be established in its operating condition indicating correct correlation even though no correlation tests are made, namely, no correlation signal components are present. Such a shortcoming may be disadvantageous for several reasons. For example, when the output of the correlator flip-flop is employed to control the operation of a recording or use meter, a charge may be recorded if, during the telecasting of a regular subscription program to which a person has subscribed, the television receiver is tuned to a non-subscription program. Obviously, this would present an inequitable situation.

On the other hand, and entirely divorced from the possibility of unfair charges, in a system wherein the correlation signal components are combined with the code signal components and routed through the code-determining switches to the mode-determining circuit and in which the switches are so arranged that in one of their positions an applied signal component is "thrown away" (channelled to ground rather than to an input of the mode-determining circuit as in Patent 2,823,252), it may be possible for a subscriber bent on fraud to adjust his code-determining elements by a trial and error technique so that the correlation signal components are rendered ineffective by directing them to the throw-away position. In such a case, the comparator would not receive any correlation signal components and thus would not actuate the correlator flip-flop to either one of its conditions. If that flip-flop had previously been established in its condition which indicates correct correlation, the video and/or audio channels would be turned on even though the subscriber had not actually subscribed to the program. Where audio unscrambling is accomplished merely by applying a control potential to the audio decoder from the correlator flip-flop, as in the copending Roschke application Serial No. 823,463, this would lead to unauthorized sound decoding.

The present invention constitutes an improvement over the Roschke system in that there is never an indication of correct correlation in the absence of a correlation test, namely in the absence of an actual comparison of a correlation signal component with the instantaneous adjustment of the code-determining elements.

Accordingly, it is an object of the present invention to provide an improved system for achieving a correlation test.

It is another object of the invention to provide an improved secrecy communication receiver for developing a control effect indicating the degree or status of correlation between the instantaneous adjustment of the receiver with respect to a predetermined adjustment.

It is a further object of the present invention to provide an improved secrecy communication receiver.

It is another object of the invention to provide a correlation arrangement which not only indicates the correlation status existing between a given code schedule and the instantaneous adjustment of code-determining elements but additionally indicates whether, in fact, correlation signal components are present.

It is a further object of the invention to provide a correlation system in which an indication of correlation can only be obtained if the correlation signal components are present.

It is an additional object to provide a novel method of operating a secrecy communication receiver.

A secrecy communication receiver, constructed in accordance with one aspect of the invention, utilizes an intelligence signal coded in accordance with a given code schedule. Decoding apparatus is provided which includes a plurality of adjustable code-determining elements to be adjusted relative to one another in accordance with a pattern dictated by the given code schedule in order to achieve decoding of the intelligence signal. There is a multi-condition mechanism having first and second operating conditions respectively indicating incorrect and correct correlations between the given code schedule and the instantaneous adjustment of the code-determining elements. Means are provided for actuating the multi-condition mechanism to its first operating condition. There are means for subsequently actuating the mechanism from its first to its second operating condition if there is correct correlation between the given code schedule and the instantaneous adjustment of the code-determining elements. Means are provided for deriving from the multi-condition mechanism a control effect indicating the correlation status, and means for utilizing the control effect.

In accordance with a further aspect of the invention, the adjustable code-determining elements are included in signal-generating apparatus which develops a comparison signal having a characteristic determined in part by the instantaneous adjustment of the code-determining elements. There are means responsive to the comparison signal for comparing the instantaneous adjustment of the code-determining elements with a predetermined adjustment to determine the condition of correlation therebetween, and for actuating the multi-condition mechanism to its second operating condition only in response to a condition of correct correlation.

In accordance with another aspect of the invention, the multi-condition mechanism is initially established in its second operating condition. Means are then provided for subsequently establishing the multi-condition mechanism in its first operating condition only if there is an incorrect correlation between the given code schedule and the instantaneous adjustment of the code-determining elements.

In accordance with a further aspect of the invention, the decoding apparatus is actuated during each of a series of spaced state-determining intervals to establish the apparatus in different operating states during the intervening intervals. A correlation test is effected for each state-determining interval to compare the instantaneous adjustment of the code-determining elements, as reflected by the instantaneous operating state of the decoding apparatus, with the code schedule of the intelligence signal to determine if the code-determining elements are correctly positioned.

The features of this invention which are believed to be new are set forth with particularly in the appended claims. The invention, together with further objects and advantages thereof, may best be understood, however, by reference to the following description in conjunction with the accompanying drawings, in which identical reference numerals indicate identical elements, and in which:

FIGURE 1 is a block diagram representation of a secrecy communication transmitter, specifically a subscription television transmitter;

FIGURE 2 schematically illustrates a secrecy communication receiver, specifically a television receiver, constructed in accordance with one embodiment of the invention and arranged to utilize the signal transmitted from the transmitter of FIGURE 1;

Figure 2:
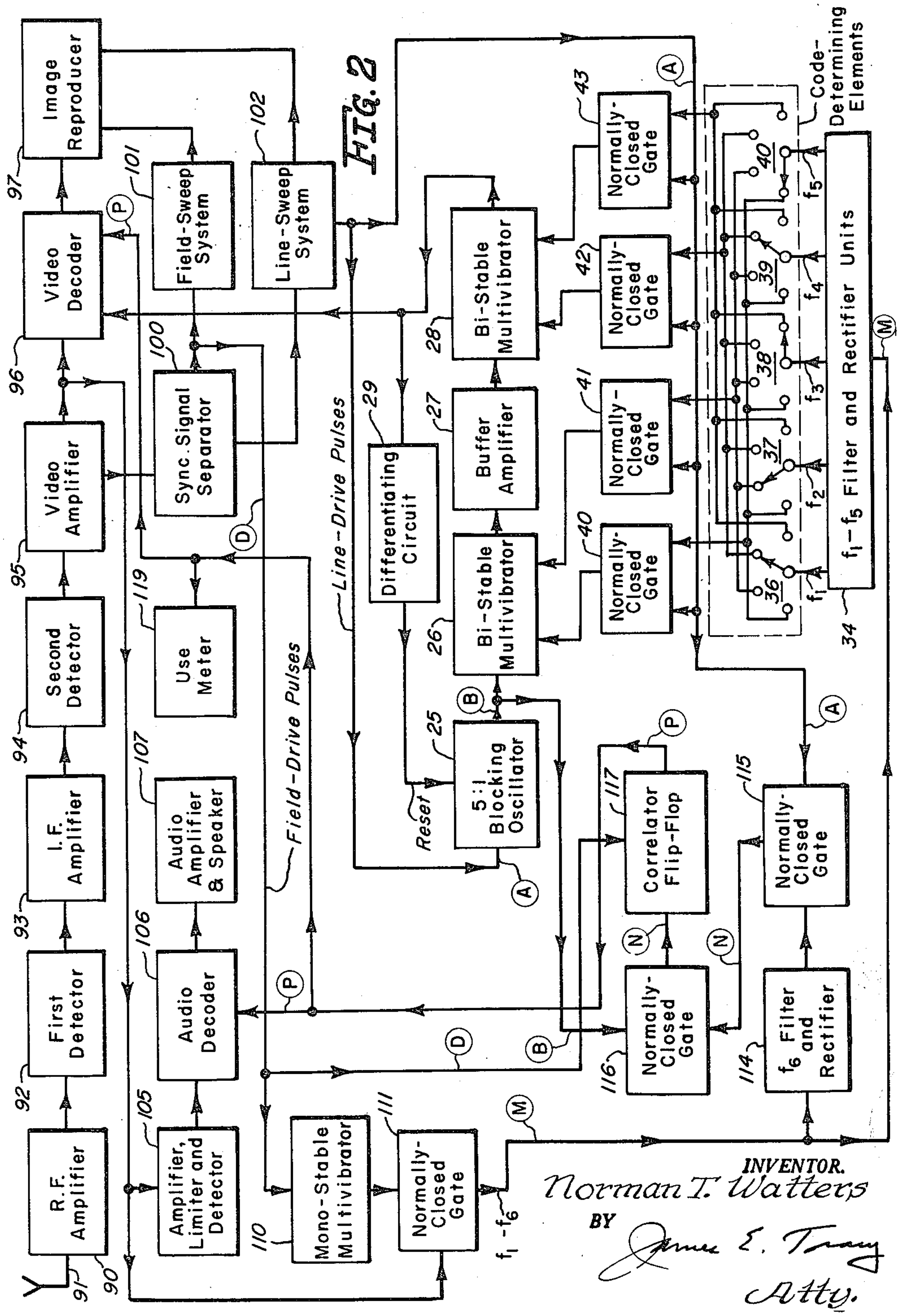
Figure 4:
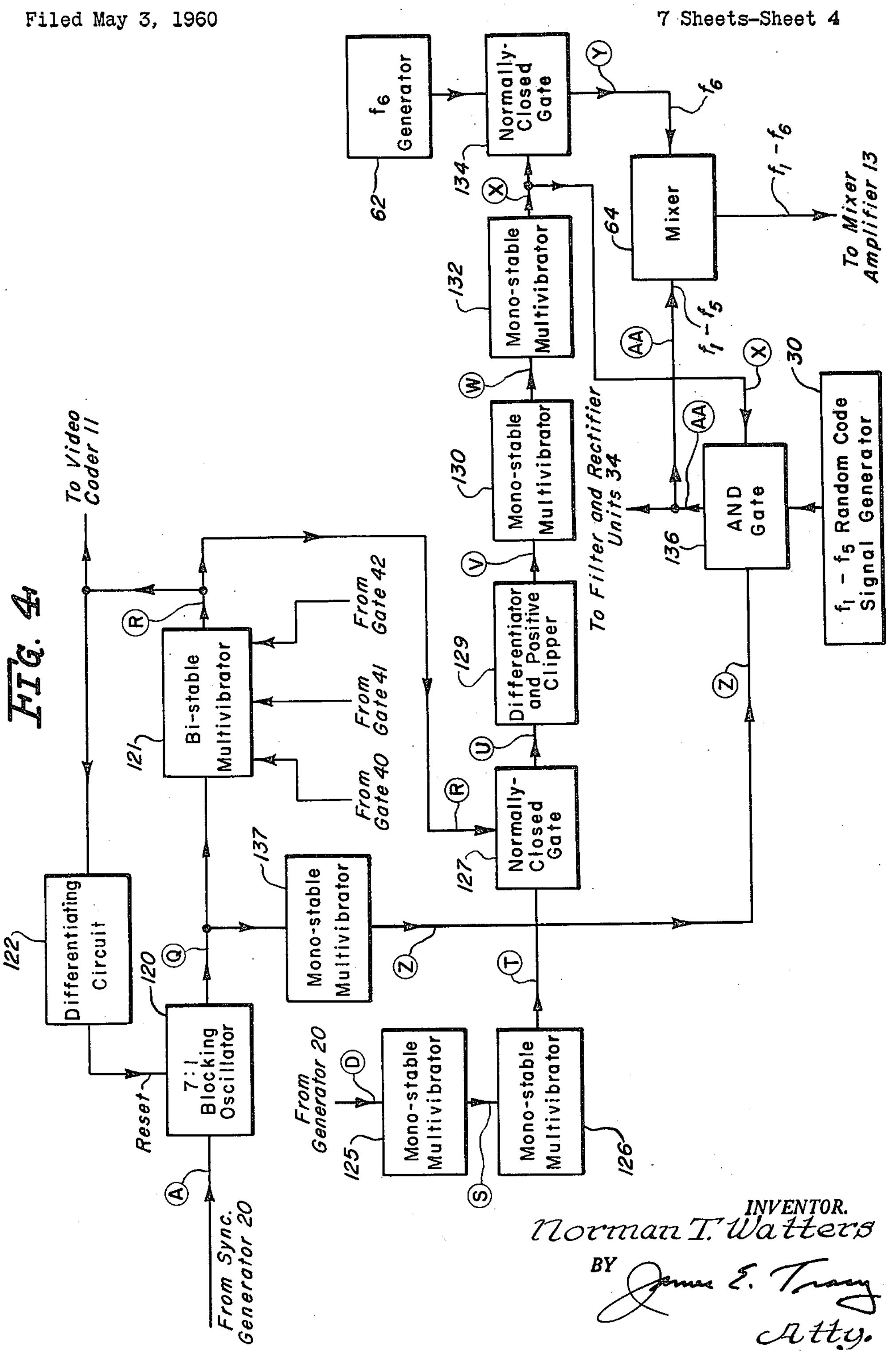
FIGURE 4 represents a modification of the transmitter of FIGURE 1.
Figures 5, 7, 8, 9:
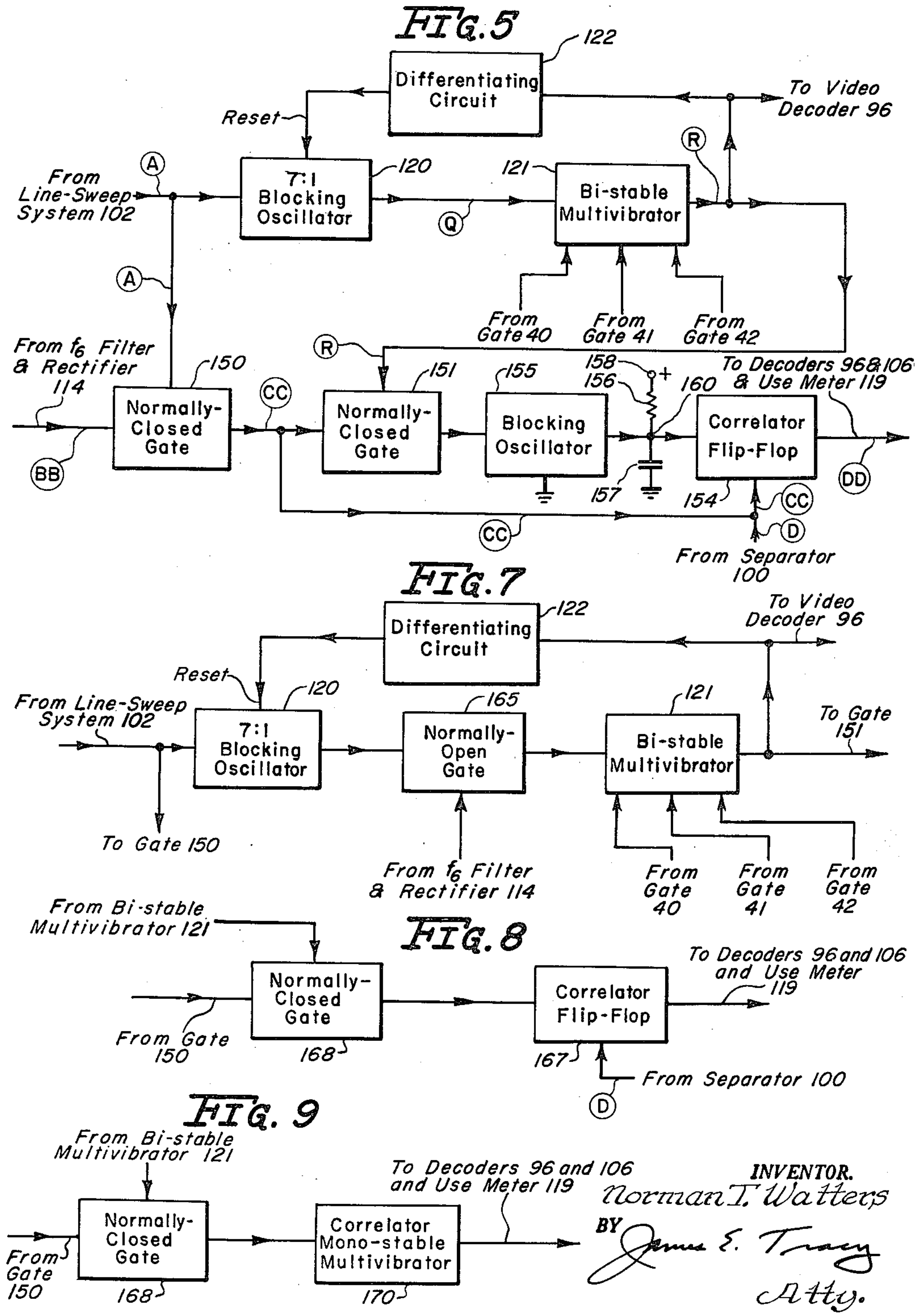
Figure 6:
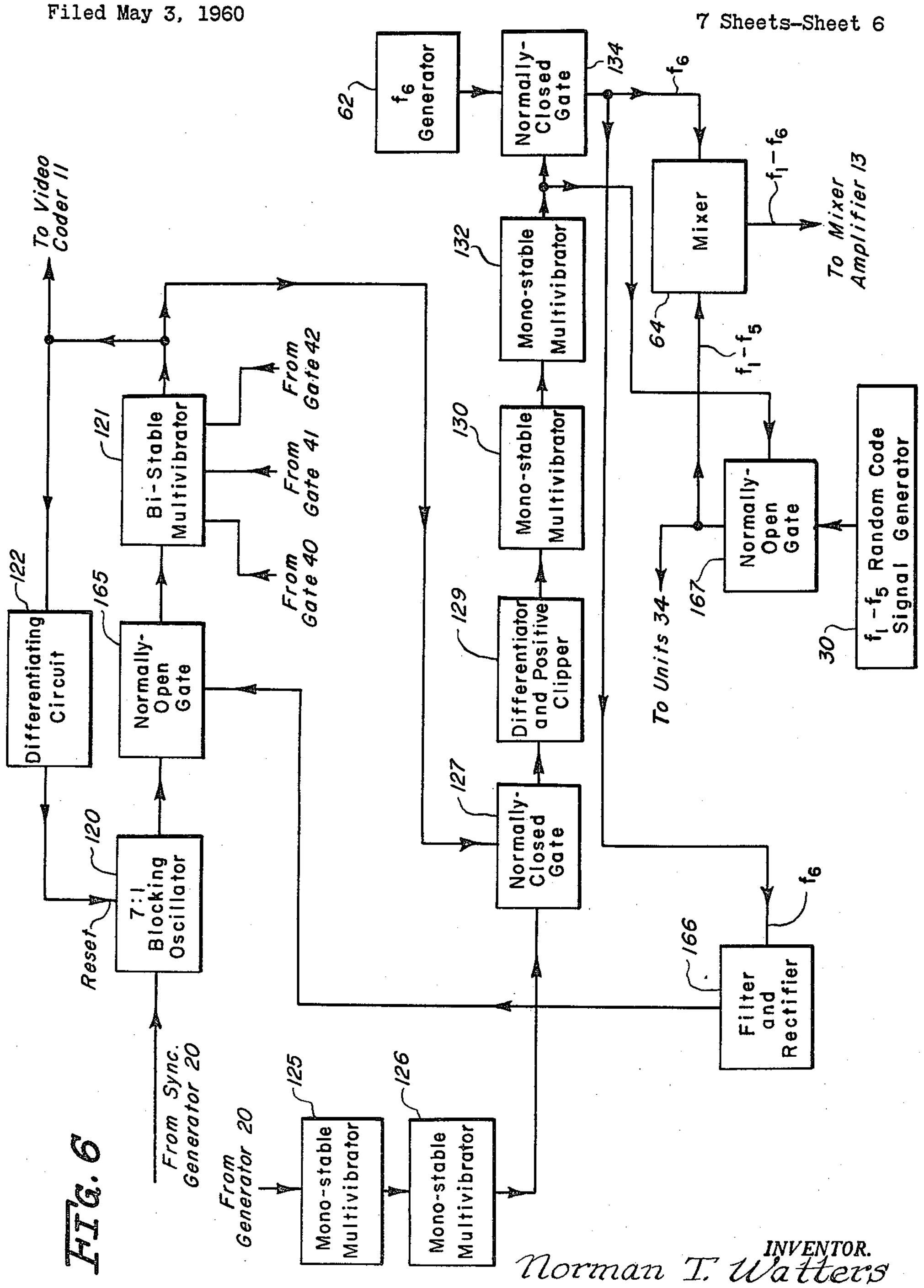
Figure 10:
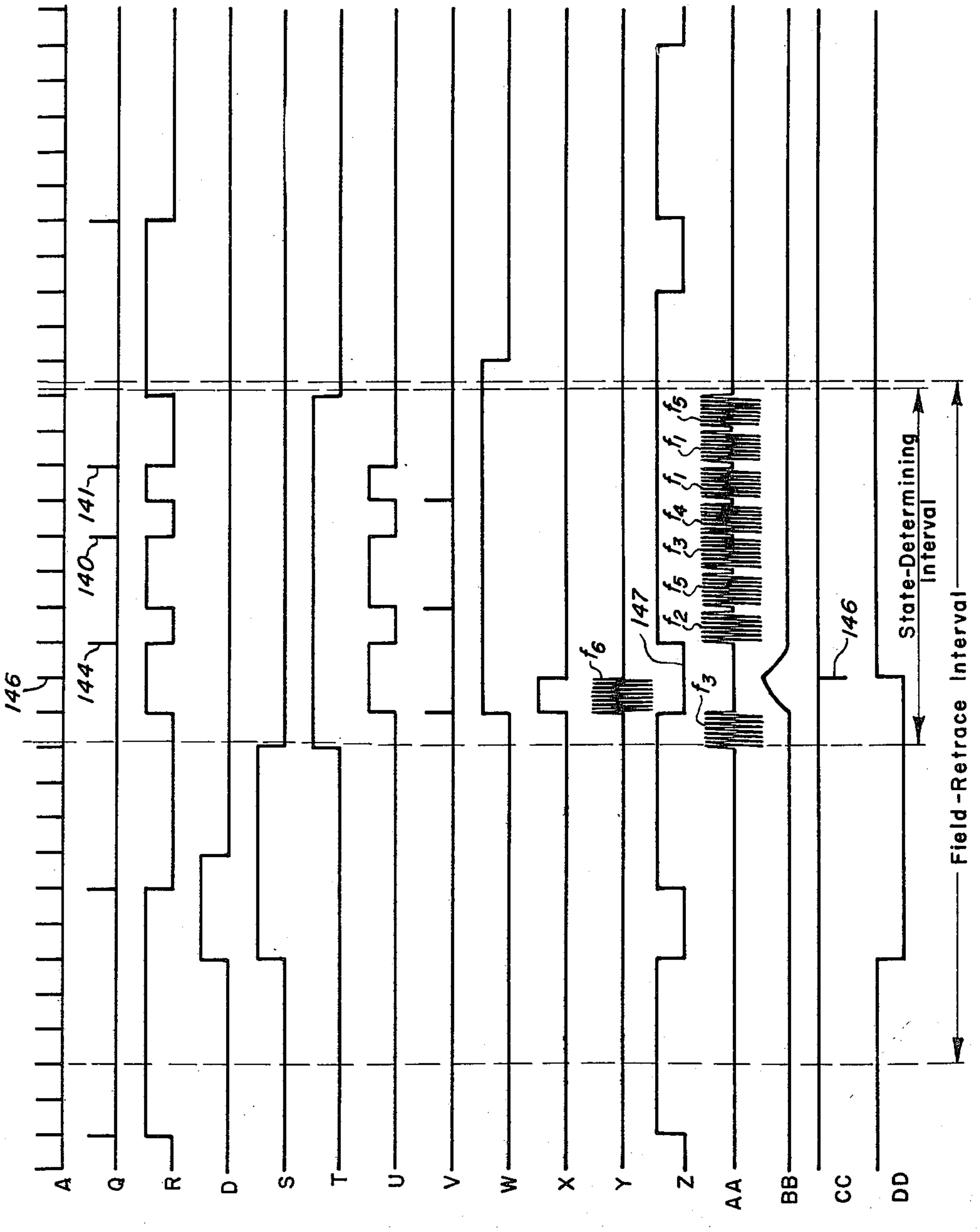

FIGURE 5 schematically represents a modification of the receiver of FIGURE 2, illustrating another embodiment of the invention, and is arranged to utilize the signal transmitted from the transmitter of FIGURE 4;

FIGURE 6 shows a modification of the transmitter of FIGURE 4;

FIGURE 7 is a block diagram representation of a modification of the receiver of FIGURE 5, constructed in accordance with another embodiment, and is arranged to utilize the signal transmitted from the transmitter of FIGURE 6;

FIGURE 8 depicts a modification of the receiver of FIGURE 5 and illustrates another embodiment of the invention;

FIGURE 9 represents another modification of the receiver of FIGURE 5 and shows still another embodiment of the invention; and, FIGURE 10 illustrates a series of signal wave forms helpful in describing the operations of the arrangements of FIGURES 4–9.

Figure 1:
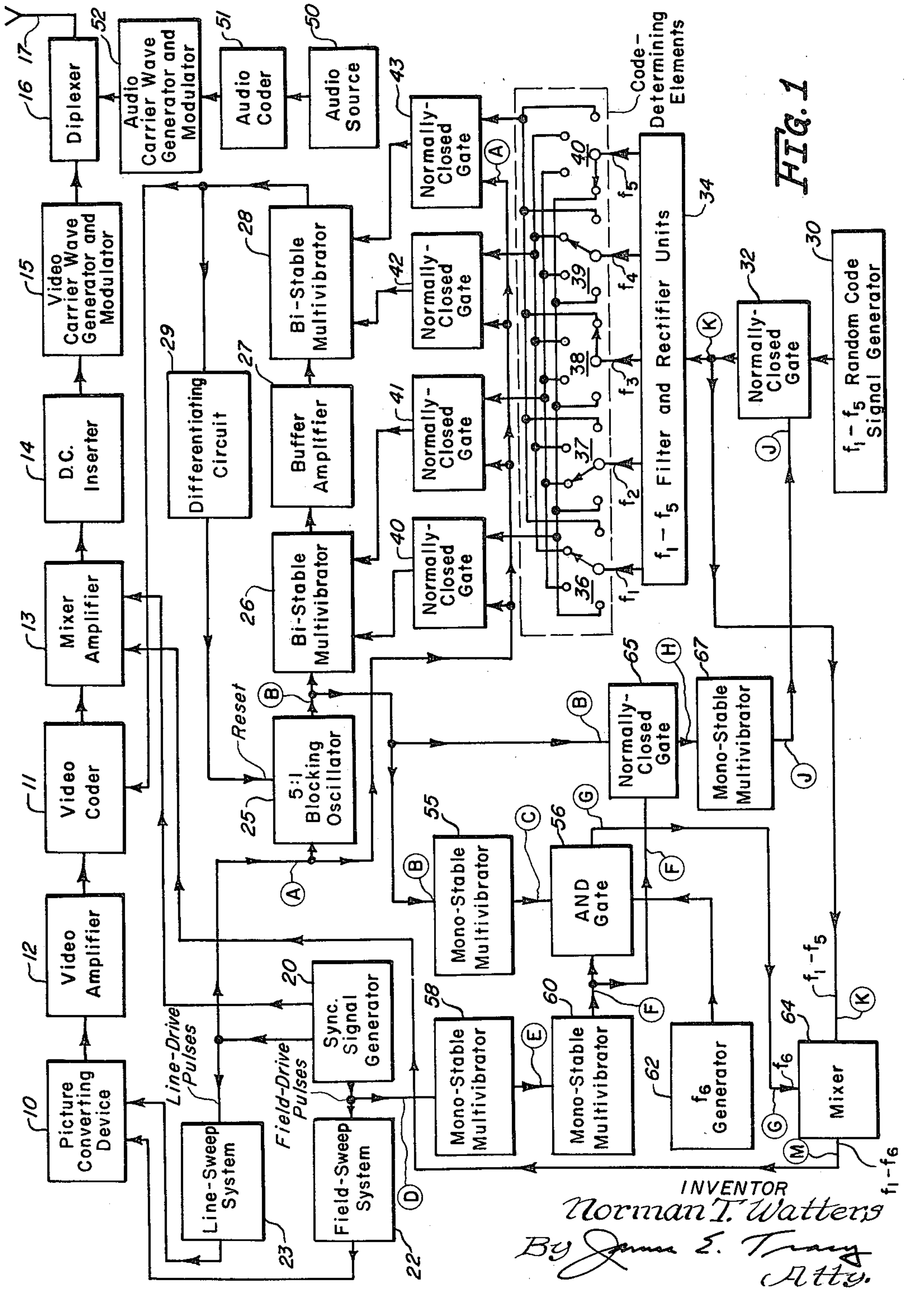

Before turning to a description of the structure of FIGURE 1, it should be understood that many of the circuits shown in block diagram are illustrated in greater detail in several copending patent applications and issued patents, for example in applications Serial Nos. 479,170, filed December 31, 1954, in the name of Erwin M. Roschke; and 798,774, filed March 11, 1959 in the name of Norman T. Watters, now Patent No. 2,995,624, issued Aug. 8, 1961, both of which are assigned to the present assignee. The expedient of block diagram illustration has been employed in the interest of simplification and in order to pinpoint clearly the invention.

Considering now more particularly the transmitter of FIGURE 1, a picture converting device or camera tube 10 is provided and may take any conventional form for developing a video signal representing an image to be televised. A video encoding device or coder 11 is coupled to the output terminals of camera tube 10 through a video amplifier 12. This coder may be similar to that disclosed and claimed in Patent 2,758,153, issued August 7, 1956 to Robert Adler, and assigned to the same assignee as that to which the present application is assigned. More particularly, coder 11 may comprise a beam-deflection switch tube having a pair of target anodes connected respectively to a pair of output circuits which may be selectively interposed in the video channel as the electron beam of the tube is deflected from one to the other of the two anodes, thereby to establish two different operating modes. A delay line is included in one of the output circuits so that when the beam is directed to the associated target, a time delay is introduced to the video components relative to the synchronizing components of the radiated television signal. Switching of the beam is accomplished in accordance with a secret code schedule or mode-changing pattern by means of a beam deflection-control or actuating signal applied to the deflection electrodes of coder 11. Of course, intermittently varying the relative timing of the video and synchronizing signals effectively codes the television signal since ordinary television receivers, not containing suitable decoding apparatus, require a television signal wherein there is a constant time relation between its video and synchronizing components. If such is not the case, intelligible image reproduction is impossible.

The output of coder 11 is coupled to one pair of input terminals of a mixer amplifier 13, which in turn is connected through a direct current inserter 14 to a video carrier wave generator and modulator 15 having its output terminals connected through a diplexer 16 to a transmitting antenna 17. A synchronizing signal generator 20 supplies the usual field- and line-synchronizing components and associated pedestal components to mixer amplifier 13 over suitable circuit connections, here schematically illustrated as a single conductor. Generator 20 further supplies field- and line-drive pulses to a field-sweep system 22 and to a line-sweep system 23, respectively. The output terminals of sweep systems 22 and 23 are connected to the field- and line-deflection elements (not shown) associated with picture converting device 10.

Synchronizing-signal generator 20 additionally supplies line-drive pulses to one input of a conventional 5:1 step-down blocking oscillator 25 which has its output terminals connected to the input circuit of a cascade arrangement of two bi-stable multivibrators 26 and 28 separated by a buffer amplifier 27. Specifically, the output of blocking oscillator 25 is connected to the "common" or "counting" input circuit of bi-stable multivibrator 26. This multivibrator may be of conventional construction, including the usual pair of cross-coupled triodes or transistors rendered conductive in alternation as the multivibrator is triggered between its two stable operating conditions. Blocking oscillator 25 is coupled to both of the triodes or transistors, whichever the case may be, by way of the common or counting input so that the multivibrator is always triggered from its instantaneous condition, whatever one that may be, to its opposite condition in response to successive pulses applied from the oscillator. Amplifier 27 is connected to multivibrator 28 in a fashion similar to the connection of oscillator 25 to multivibrator 26 so that multivibrator 28 is always actuated from one to the other of its two stable operating conditions in response to successive pulses from amplifier 27. The output terminals of multivibrator 28 connect to the deflection electrodes of coder 11. Since the cascade arrangement of blocking oscillator 25 and multivibrators 26 and 28 realize a total count-down ratio of 20:1, the control signal from multivibrator 28 exhibits a rectangular wave shape having amplitude changes every ten line traces. This effects actuation of video coder 11 between its two operating conditions and interposes the time-delay network in the video channel during alternate groups of ten successive line trace intervals to introduce a time delay between the radiated video and the synchronizing components.

Blocking oscillator 25 is a counting mechanism which, in response to applied periodically recurring signal components, is actuated step-by-step through a sequence of five operating steps in completing each cycle of operation. On the other hand, the arrangement of units 25, 26 and 28, considered collectively, constitutes a counting apparatus having a sequence of twenty operating steps.

To reset blocking oscillator 25 to its reference or zero-count operating step, a feedback circuit, including a differentiating circuit 29, is provided from the output of multivibrator 28 to the reset input of the oscillator. The amplitude excursions of the control signal from multivibrator 28 determine when oscillator 25 is reset.

In order to interrupt the periodic, cyclic actuation of the counting chain 25, 26, 28, a random code signal generator 30 is provided for developing during a portion, called a "state-determining interval," of each field-retrace interval a combination or group of code signal components or bursts individually having a predetermined identifying characteristic, such as frequency, and collectively representing coding information in accordance with their appearance and order within the combination. Suitable generating apparatus for performing the function assigned to block 30 in the present application is shown, for example, in the aforementioned Druz et al. Patent 2,923,764; Patent 2,862,049, issued November 25, 1958 in the name of Jack E. Bridges, assigned to the present assignee; and also in copending application Serial No. 463,702, filed October 21, 1954, in the name of Carl G. Eilers et al., now Patent No. 2,947,804, issued Aug. 2, 1960, and also assigned to the present assignee. As is explained in detail in these prior disclosures, the code signal combination during each field-retrace interval may comprise a series of up to six code bursts, each of which may be any of six various frequencies designated $f_1$–$f_6$, inclusive, preferably randomly sequenced and randomly appearing within the overall code burst interval. The maximum of six code signal bursts occur during intervals between successive line-synchronizing pulses superimposed on the vertical blanking pedestal subsequent to the second series of equalizing pulses. The six successive line-trace intervals, making up the state-determining interval, may for convenience be designated "slots," as has been done in copending application Serial No. 829,106, filed July 23, 1959, in the name of Richard C. Herrmann et al., and assigned to the present assignee. For reasons which will be appreciated later, it is expedient that the code burst frequencies exhibit only the five different frequencies $f_1$–$f_5$. Of course, the code generating apparatus of the prior disclosures may be modified in very simple fashion in order that five rather than six signal frequencies are developed.

The output of random code signal generator 30 is connected to one input of a normally-closed gate circuit 32, the output of which is connected to a series of five filter and rectifier units, conveniently shown in FIGURE 1 by a single block 34, respectively selective to assigned ones of the different frequencies $f_1$–$f_5$ to facilitate separation of the code signal components of those frequencies from one another. The five outputs of the filter and rectifier units, each of which produces rectified pulses or envelopes of one of frequencies $f_1$–$f_5$ as indicated in the drawing, are individually connected to an assigned one of a series of five adjustable code-determining elements 36–40. Specifically, each of the code-determining elements takes the form of a simple four-position rotary switch. Corresponding stationary contacts of switches 36–40 are connected together in common and thence to an input circuit of a respective, assigned one of a series of four normally-closed gate circuits 40–43. More particularly, starting with the stationary contact on the extreme left for each of switches 36–40 and considering the contacts in clockwise order, the four stationary contacts of each switch are connected respectively to gates 40–43. The $f_1$ output of filter and rectifier units 34 is connected to the movable contact of code-determining element 36, the $f_2$ output to the rotary contact of switch 37 the $f_3$ output is connected to the movable contact of switch 38, the $f_4$ output of unit 34 is coupled to the movable contact of switch 39, and the $f_5$ output of filter and rectifier units 34 is connected to the movable contact of four-position rotary switch 40.

Code-determining or signal-translating elements 36–40 collectively may be considered a permutation or a transposition mechanism for establishing different prescribed ones of a multiplicity of different interconnection patterns between the input circuits to the code-determining elements and the output circuits therefrom. Of course, the form taken by code-determining elements 36–40 in the present disclosure is relatively simple but obviously much more sophisticated switching arrangements may be employed. For example, suitable permutation switching mechanisms for serving the function of code-determining elements 36–40 and at the same time providing adequate degrees of security against unauthorized deciphering are disclosed in Patents 2,866,961, issued December 30, 1958, in the name of George V. Morris; 2,903,686, issued September 8, 1959, in the name of Jack E. Bridges; and in copending patent application Serial No. 490,078, filed February 23, 1955, and issued April 18, 1961 as Patent 2,980,901, in the name of George V. Morris et al., all of which patent disclosures are assigned to the present assignee.

It is not necessary that switches 36–40 be individually adjustable under the control of a corresponding number of control knobs. For example, a card or tape having different patterns or perforations may be employed to set up the switches. Connections between the input and output circuits would be established through the holes. Moving the tape or card would present a different pattern or layout of holes to the switches, thereby establishing a different permutation between the input and output circuits of the code-determining elements.

Code-determining elements 36–40 are provided to permute applied code signal components of frequencies $f_1$–$f_5$ in order that they may be fully coded before they are used for coding the program signal. It is contemplated that this switching arrangement will be adjusted differently for each different program for which a charge is to be assessed and, if desirable, the arrangement of code-determining elements installed at each receiver within a given service area will require a different setting for any selected program in order that each subscriber must obtain different switch setting data for each program.

Normally-closed gate circuits 40–43 are also individually connected to synchronizing signal generator 20 to receive line-drive pulses therefrom. The output circuits of gates 40 and 41 are connected to input circuits of multivibrator 26, and the output circuits of gates 42 and 43 are connected to input circuits of bi-stable multivibrator 28. Gates 40 and 42 are preferably coupled to the common or counting input circuits of multivibrators 26 and 28, respectively, so that each time a pulse is translated through one of those gates, the associated multivibrator is triggered from its instantaneous condition, whichever one that may be, to its opposite condition in the same manner as if it had been supplied with a pulse from blocking oscillator 25, in the case of multivibrator 26, or from buffer amplifier 27 in the case of multivibrator 28. On the other hand, the connections from gates 41 and 43 are preferably connected to "reset" inputs of multivibrators 26 and 28, respectively, which actuate the multivibrators to predetermined ones (specifically, to zero count) of their two operating conditions. If either of the multivibrators is already in that condition when a pulse is supplied thereto from its associated one of gates 41, 43, there will be no actuation and the pulse will be ineffective.

The audio signal portion of the telecast is provided by audio source 50 which may constitute a conventional microphone and audio amplifier. The output of audio source 50 is coupled through an audio coder 51 to one input of an audio carrier wave generator and modulator 52, the output circuit of which is coupled to another input of diplexer 16. Audio coder 51 may take any one of a multiplicity of different forms. The only requirement is that it successfully scramble the audio intelligence. Coder 51 may, for example, be simply a frequency shift type of coder in which heterodyning techniques are employed to shift the audio information, with an inverted frequency distribution, to a portion of the frequency spectrum where it does not normally reside. Preferably, the audio signal is shifted or moved to a higher portion of the frequency spectrum. Such an audio scrambling function is adequate since it effectively codes a characteristic of the audio signal inasmuch as a normal television receiver would not contain suitable compensating circuitry for re-inverting the audio signal components.

As will be explained, circuitry identical to units 25–43 is found in the receiver of FIGURE 2 and in order to maintain precise synchronism of operation between such corresponding circuitry, it is essential that the code-determining elements 36–40 at the receiver be positioned identically as the companion switches in the transmitter of FIGURE 1. To test for correlation in accordance with the present invention, namely to effectively compare the switch setting pattern of the receiver with respect to that at the transmitter, it is necessary that a correlation signal component be generated at the transmitter and conveyed to the receiver. This correlation signal component, as will be learned, is tied in or related to the code schedule of the coded video signal.

To this end, the output terminals of 5:1 blocking oscillator 25 are also coupled to the input of a single-trip or mono-stable multivibrator 55, whose output terminals are connected to one input of an AND gate 56. The parameters of mono-stable multivibrator 55 are so selected that once it is actuated from its normal to its abnormal operating condition, it will remain there for a time interval embracing four complete line-trace intervals. Another mono-stable or single-trip multivibrator 58 is coupled to synchronizing signal generator 20 to derive field-drive pulses therefrom and has its output terminals connected to a mono-stable multivibrator 60 which, in turn, has its output circuit connected to another input circuit of AND gate 56. Multivibrator 58 is designed so that it actuates to its abnormal condition in response to the leading edge of each field-drive pulse and remains in that condition for a period of nine complete line-trace intervals, at which time it returns to its normal operating condition. Mono-stable multivibrator 60, on the other hand, is constructed so that it assumes its abnormal condition in response to the trailing edge of each output pulse from multivibrator 58 and remains there for a period of five complete line-trace intervals. It will be appreciated later that the timing and duration of the output pulse from multivibrator 60 is actually determined by the particular portion (namely, the state-determining interval) of each field-retrace interval in which code signal bursts from random code signal generator 30 appear. A signal generator 62 which produces a continuous sinusoidal signal of frequency $f_6$ is coupled to another input of AND gate 56. The single output circuit of AND gate 56 is connected to one input of a mixer 64.

The output of blocking oscillator 25 is also coupled to one input of a normally-closed gate circuit 65, another input of which is connected to the output of mono-stable multivibrator 60. The output of gate 65 is connected to the input of a mono-stable or single-trip multivibrator 67, which is designed to assume, when triggered, its abnormal condition for six full line-trace intervals. The output of multivibrator 67 is connected to another input of normally-closed gate circuit 32.

Considering now the operation of the transmitter of FIGURE 1, picture converting device 10 develops a video signal representing the picture or image information to be televised and after amplification in amplifier 12 the video signal is translated through video coder 11 to mixer amplifier 13 wherein it is combined with the customary field- and line-synchronizing and blanking pulses from synchronizing signal generator 20. Mixer 13 therefore develops a composite video signal which is applied through direct current inserter 14 to video carrier wave generator and modulator 15 wherein it is amplitude modulated on a picture carrier for application through diplexer 16 to antenna 17 from which it is radiated to subscriber receivers. Sweep systems 22 and 23 are synchronized by the field- and line-drive pulses from generator 20 in conventional manner.

Audio source 50 meanwhile picks up the sound information accompanying the telecast, amplifies and supplies it to audio coder 51 wherein the audio components are shifted in the spectrum to occupy abnormal positions to achieve sound scrambling. The coded audio signal is frequency modulated on a sound carrier in unit 52, and supplied through diplexer 16 to antenna 17 for concurrent radiation to subscriber receivers with the video information.

Coding of the video portion of the telecast is achieved by coder 11 under the influence of a deflection-control signal developed from line-drive pulses by blocking oscillator 25 and multivibrators 26 and 28 for periodically switching the beam of the beam-deflection tube in coder 11 back and forth between its two collector anodes in accordance with the code schedule represented by the amplitude variations of the control signal, which occurs every ten line traces because of the total 20:1 ratio of counting stages 25, 26, 28. This actuation of encoding device 11 varies the operating mode of the transmitter after every group of ten successive line-trace intervals by modifying the time relation between the video and synchronizing components of the radiated signal and provides effective picture scrambling or coding.

In order to interrupt this periodic mode-changing pattern and increase the complexity of the code schedule, a combination of up to six code signal components or bursts individually exhibiting one of frequencies $f_1$–$f_5$ is developed in source 30 during the state-determining portion of the field-retrace interval. Assuming for the moment that gate 32 is established in its open or translating condition, the bursts of frequency $f_1$–$f_5$ are separated from one another and rectified in filter and rectifier units 34 for individual application to normally-closed gates 40–43 via code-determining elements <u>36–40</u>. The distribution of the rectified envelopes or pulses of frequencies $f_1$–$f_5$ to gates 40–43 depends, of course, on the instantaneous setting of the code determining elements. In this way, the code signal components are effectively permuted. FIGURE 1 illustrates a typical setting of elements <u>36–40</u>. Gates 40–43 also receive line-drive pulses from generator 20 and gate in those of the line-drive pulses that occur in time coincidence with the rectified code bursts to the various input circuits of multivibrators 26 and 28. The multivibrators are therefore actuated in response to selected ones of the line-drive pulses. Since the code components are preferably randomly sequenced, the cyclic actuation of the multivibrators, normally taking place in response to pulses from oscillator 25 only, is interrupted so that upon the termination of each combination of code bursts the counting chain, made up of units 25, 26 and 28, is established at a different one of its twenty operating steps from that in which it would have been established if the periodic actuation had not been interrupted.

The control signal developed in the output of multivibrator 28 constitutes a rectangular shaped signal which is phase modulated during field-retrace intervals. In order to add additional scrambling to the system, the rectangular shaped control signal from multivibrator 28 is differentiated in differentiating circuit 29 and the differentiated pulses are fed back to oscillator 25 for resetting purposes. Depending on the particular point in the circuit of oscillator 25 at which the reset pulses are applied, determines whether resetting is accomplished in response to the positive- or negative-going amplitude excursions of the control signal from multivibrator 28. If, for example, unit 25 is arranged so that resetting is only accomplished in response to positive pulses or spikes, then the pulses developed in differentiator circuit 29 are of correct polarity only in response to positive-going amplitude excursions of the control signal, the negative spikes developed in differentiator 29 from the negative going excursions having no effect.

Since the random actuation of multivibrators 26 and 28 controls the resetting of oscillator 25, the oscillator is also effectively reset at random so that upon the termination of each combination of code signal bursts occurring during a state-determining interval, the output pulses of blocking oscillator 25 may exhibit any one of five different phase conditions. Since the blocking oscillator is actuated only by line-drive pulses during the field-trace intervals, the phase condition of the output pulses from oscillator 25 at the termination of each code burst combination endures or persists for the entire succeeding field-trace interval. Each of the five phase conditions may be considered an operating state of the coding apparatus, and thus blocking oscillator 25 establishes the coding apparatus selectively in one of five different operating states. It may be assumed that blocking oscillator 25, multivibrators 26 and 28, video coder 11, differentiator 29, gates 40–43, code-determining elements <u>36–40</u>, and filter and rectifier units 34, principally make up the coding apparatus. The operating state, or phase condition of the output pulses from oscillator 25, is changed as a result of the random nature of the code signal bursts from generator 30 and also the instantaneous adjustment of code-determining elements <u>36–40</u>.

Figure 3:
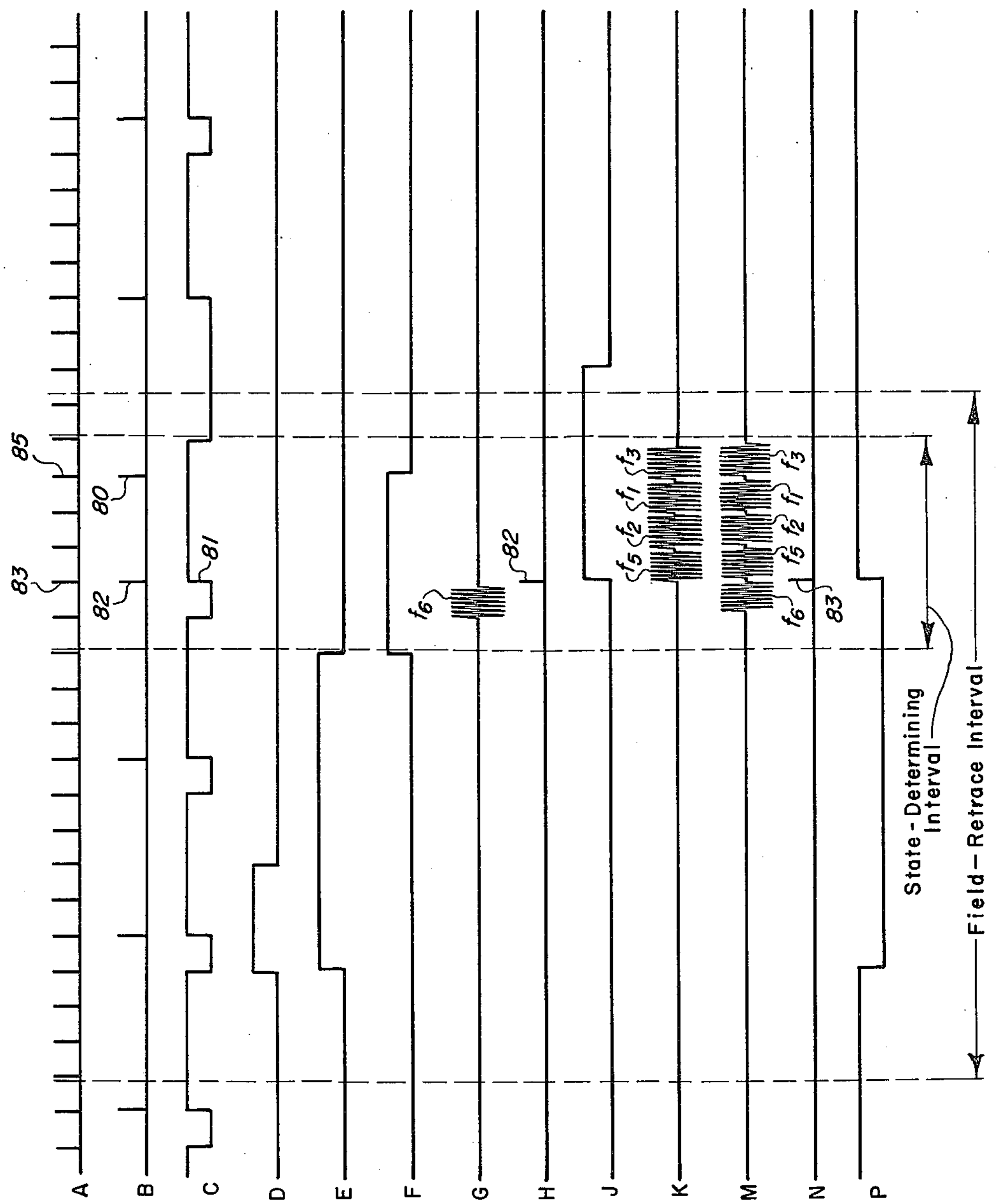
FIGURE 3 depicts a family of wave forms useful in explaining the operation of the transmitter of FIGURE 1 and the receiver of FIGURE 2.

Considering now the specific manner in which the present invention is implemented, attention is directed to the idealized signal wave forms shown in FIGURE 3, identified by letter designation which are also shown in the circuit of FIGURE 1 indicating the various points at which the wave forms appear. The periodically recurring line-drive pulses which actuate blocking oscillator 25 are shown in curve A. Because of the 5:1 division of oscillator 25, pulses like those shown in curve B are developed in the oscillator output. It will be noted that the first four pulses (starting from the left) of curve B occur in periodically recurring manner and in response to every five successive line-drive pulses. The fifth pulse, however, designated 80, appears during the state-determining interval and after only three line-drive pulses. Subsequent to pulse 80, the last two pulses of curve B recur in regular fashion. It will be assumed that pulse 80 is produced due to the effect of a reset pulse applied over the reset input of oscillator 25, which is initiated by the feedback signal from multivibrator 28. The timing of pulse 80 determines which one of the five possible operating states the coding apparatus will assume during the entire field-trace interval subsequent to the field-retrace interval shown in FIGURE 3. Of course, oscillator 25 may be reset more than once during a state-determining interval as the result of random actuation of multivibrators 26 and 28. Assume, for example, that oscillator 25 is reset one full line trace subsequent to pulse 80, in which case the coding apparatus assumes a different one of the five operating states.

The pulses of curve B from the output of oscillator 25 are applied to mono-stable multivibrator 55 to produce the signal of wave form C. Multivibrator 55 is triggered to its abnormal condition in response to each pulse of curve B and remains there for four horizontal trace intervals before it returns to its reference condition. Pulse 80 has no effect on multivibrator 55 since the multivibrator is already established in its abnormal condition at that time. The purpose of multivibrator 55 is to develop a gating pulse of negative polarity one line trace in duration and occurring immediately preceding each output pulse of blocking oscillator 25, other than the output pulses like 80 resulting from the reset operation. In this way, a negative polarity gating pulse is provided immediately preceding the first "free count" output pulse of blocking oscillator 25 during the state-determining interval, namely during the interval in which the code signal bursts from generator 30 initiate disruption of the normal counting action of the coding apparatus. It will be appreciated that the output pulses of oscillator 25 are due to either a normal completion of a five-step counting cycle, in which case they are called "free count" pulses, or due to the feedback signal from unit 28, in which case they may be called "reset" pulses. Pulse 80 of curve B is a reset as distinguished from a free count output pulse. Pulse 82 of curve B, on the other hand, is a free count pulse.

The gating pulses of curve C are applied to one input of AND gate 56. Meanwhile, field-drive pulses, like the one shown in curve D, are applied to mono-stable multivibrator 58, which responds to the pulse of curve D to produce the positive-polarity pulse of curve E for application to mono-stable multivibrator 60 which in turn develops the positive-polarity pulse of curve F for application to another input of AND gate 56. Generator 62 continuously supplies a sinusoidal signal of frequency $f_6$ to a third input of AND gate 56. Unit 56 must, of course, be simultaneously supplied with three different input signals over its three input circuits before a signal is developed at its output. The positive pulse of curve F and negative pulse 81 of curve C therefore cooperate to effectively translate to the output of gate 56, and thence to an input of mixer 64, during the interval of pulse 81 a burst of code signal of frequency $f_6$, as shown by wave form G.

It will be noted that the burst of curve G endures for one complete line trace immediately preceding the first free count pulse, designated 82, of curve B during the state-determining interval. The timing of pulse 82, of course, is determined by the manner in which blocking oscillator 25 had been reset as a result of the code components during the field-retrace interval preceding the one shown in FIGURE 3, namely the timing of pulse 82 was determined one full field trace preceding the state-determining interval of FIGURE 3. Consequently, the timing of the burst of curve G effectively represents the operating condition in which oscillator 25 is established, or the counting step executed by oscillator 25, during the interval of pulse 82. The timing of the $f_6$ burst of curve G also is a representation of the operating state of the coding apparatus during the preceding field-trace interval. It should be realized that each code burst of frequencies $f_1$–$f_5$ is not effective until the occurrence of the immediately succeeding line-drive pulse in both the coding apparatus and the decoding apparatus. This obtains since the rectified envelope of each code burst embraces the immediately succeeding line-drive pulse and thus gates in that line-drive pulse to the multivibrators. With the $f_6$ burst of curve G so positioned, it may be employed at a receiver to gate in or select line-drive pulse 83 of curve A.

The gating pulse of curve F is also employed to open normally-closed gate 65 in order to gate in to the input of mono-stable multivibrator 67 pulse 82 (curve H) developed in the output of oscillator 25. Multivibrator 67 therefore actuates to its abnormal condition in response to pulse 82 and remains there for six complete line-trace intervals. The signal developed in the output of multivibrator 67 is shown in curve J, and is applied to one input of normally-closed gate 32 to provide a gating signal therefor.

Returning now to random code signal generator 30, some of the code signal bursts of frequencies $f_1$–$f_5$ are effectively inhibited in normally-closed gate 32. This gate is only turned on or established in its translating condition in response to the positive pulse component of wave form J. Consequently, any code signal bursts produced by random code signal generator 30 before the occurrence of free count pulse 82 are effectively deleted or removed. This expedient is employed for two reasons. In the first place, it is desirable that no code signal burst of one of frequencies $f_1$–$f_5$ occurs simultaneously with the $f_6$ correlation burst of curve G. Moreover, it is necessary that multivibrator 28 is not actuated by a code component which in turn would cause resetting of blocking oscillator 25 until the oscillator has been permitted to produce a free count pulse during the state-determining interval. The combination of code bursts shown in wave form K is thus typical of what may be developed at the output of gate 32 during a given field-retrace interval. It will be assumed that pulse 80 of curve B results from the actuation of multivibrator 28 by the $f_1$ burst of curve K.

It should now be apparent why resetting of blocking oscillator 25 has purposely been delayed until subsequent to the first free count pulse of the oscillator. In order to effectively examine the instantaneous operating condition of the blocking oscillator in the receiver similar to oscillator 25 in the transmitter, it is essential that the $f_6$ correlation burst of curve G occur before the blocking oscillator is subjected to a reset pulse from differentiator 29. This insures that the operating state of the receiver during the entire field-trace interval preceding the field-retrace interval shown in FIGURE 3 may be determined.

The code signal bursts of frequencies $f_1$–$f_5$ shown in curve K are applied to one input of mixer 64 and the $f_6$ correlation burst of curve G is applied to another input of mixer 64 from the output of AND gate 56. Consequently, all of the frequencies $f_1$–$f_6$ may be found in the output of mixer 64 as shown by curve M. The combination of curve M is supplied to another input of mixer amplifier 13 for concurrent radiation to the subscriber receivers along with the video information.

Of course, it is not essential that the $f_6$ correlation burst be transmitted with the code bursts and the video information. For example, the correlation bursts may be conveyed to a receiver with the audio signal in which case the burst may occur during field-trace intervals.

The receiver of FIGURE 2 is constructed in accordance with one embodiment of the invention in order to decode especially the coded television signal developed in the transmitter of FIGURE 1. A radio frequency amplifier 90 has its input terminals connected to a receiving antenna 91 and its output circuit connected to a first detector or oscillator-mixer 92, which is connected in turn through an intermediate frequency amplifier 93 to a second detector 94. This detector is coupled through a video amplifier 95 and a video decoder 96 to the input terminals of an image reproducing device or picture tube 97. Decoding device 96 may be identical in construction to coding device 11 in the transmitter except that it is controlled to operate in complementary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 96 with no delay, whereas when no delay is introduced at the transmitter, a delay is imparted to the video signal in video decoder 96. Video amplifier 95 is also coupled to a synchronizing signal separator 100 which is connected to the usual field-sweep system 101 and line-sweep system 102 connected in turn to the deflection elements (not shown) associated with picture tube 97.

Assuming that the illustrated receiver is of the intercarrier type, an intercarrier signal component is derived from video amplifier 95 and is supplied to a unit 105 consisting of a conventional amplifier, amplitude limiter and discriminator detector. The output of unit 105 is coupled through a frequency shift audio decoder 106 to an audio amplifier and speaker, combined for illustrative purposes in a single unit 107. Audio decoder 106 may be similar to audio coder 51 in the transmitter except that it is effectively operated in complementary fashion in order to shift or return the scrambled audio information from the portion of the spectrum which it occupies as transmitted back to the original, appropriate location as required to accomplish audio unscrambling.

While basically video decoder 96 and the audio decoder 106 are identical to their counterparts in the transmitter, they differ in one very important respect from such counterparts. Each of decoders 96, 106 is normally disabled or blocked by, for example, a bias arrangement and is rendered operative to unscramble or decode a scrambled signal only during intervals when an appropriate actuating or gating signal is applied thereto in a manner to be explained.

In order to facilitate the separation of the code signal and correlation components of curve M from the composite television signal, a mono-stable multivibrator 110 is connected to separator 100 to receive field-drive pulses therefrom and the output of multivibrator 110 is coupled to one input of a normally-closed gate 111, another input of which is coupled to the output of video amplifier 95 to receive the coded composite video signal. The output of gate 111 is connected to a series of filter and rectifier units for separating code bursts $f_1$–$f_5$ from each other, once again illustrated for convenience as a single block 34. By comparing the arrangement of elements 25–43 in FIGURE 2, it is manifest that this circuitry is identical in construction and arrangement with the correspondingly numbered units in the transmitter of FIGURE 1. The only difference is that while blocking oscillator 25 in the transmitter receives line-drive pulses from the sync synchronizing generator, oscillator 25 in the receiver of FIGURE 2 receives line-drive pulses from line-sweep system 102.

In order to achieve a test of correlation in accordance with one aspect of the present invention, a separate $f_6$ filter and rectifier unit 114 is connected to the output of gate 111. The output of unit 114 is connected to one input of a normally-closed gate 115, another input of which is connected to line-sweep system 102 to receive line-drive pulses therefrom. The output of gate 115 is connected to one input of a comparison device in the form of a normally-blocked gate 116, another input of which is connected to the output of blocking oscillator 25 in the receiver of FIGURE 2. The output of gate 116 is connected to one input of a multi-condition mechanism in the form of a correlator flip-flop 117 which, of course, may also be called a bi-stable multivibrator. Another input of flip-flop 117 is connected to separator 100 to receive field-drive pulses therefrom. This flip-flop has two stable operating conditions. In response to input pulses from gate 116 it assumes a predetermined one of its operating conditions, and responsive to applied pulses over its other input from separator 100 bi-stable multivibrator 117 is triggered to its other stable operating condition.

The output of correlator flip-flop or multi-condition mechanism 117 is connected to additional inputs of audio decoder 106 and video decoder 96 and also to a use meter or recording device 119 in order to control the actuation of all three of these units. Specifically, unless correlator flip-flop 117 is established in a predetermined one of its operating conditions, decoders 106, 96 remain in their normally inoperative positions and thus do not achieve unscrambling. Moreover, use meter 119 is not actuated unless flip-flop 117 is established in a particular operating condition.

Turning now to the operation of the described receiver in FIGURE 2, the coded television signal is intercepted by antenna 91, amplified in radio frequency amplifier 90 and heterodyned to the intermediate frequency of the receiver in first detector or oscillator-mixer 92. The resulting intermediate frequency signal is amplified in intermediate frequency amplifier 93 and detected in second detector 94 to produce a coded composite video signal which is then amplified in video amplifier 95 and translated through video decoder or encoding device 96 to the input electrodes of image reproducer 97 to control the intensity of the cathode ray beam in the picture tube in conventional fashion. As mentioned previously, decoder 96 is normally biased to be inoperative so that video decoding does not take place. In fact, the bias arrangement may be such that decoder 96 produces no output signal whatsoever, in which case there would be no video information, scrambled or otherwise, supplied to image reproducer 97. Assuming that a proper control potential is applied to video decoder 96 from the output of multi-condition mechanism or correlator flip-flop 117, video unscrambling occurs in complementary fashion to the video coding function in the transmitter in order that the input electrodes of picture tube 97 are supplied with completely unscrambled video signal. Sweep systems 101 and 102 are, of course, operated in conventional manner from separator 100.

The intercarrier sound signal is applied to unit 105 from video amplifier 95 wherein it is amplified, amplitude limited and demodulated to a scrambled audio signal which takes essentially the same form as that produced in the output of audio coder 51 in the transmitter. Assuming that audio decoder 106 is provided with a control potential of the proper magnitude and polarity from correlator flip-flop 117, the scrambled audio signal is successfully unscrambled by virtue of fact that the components thereof are returned to their proper positions in the frequency spectrum, and thus the output of audio decoder 106 effectively constitutes a replica of the original uncoded sound signal. This replica is then amplified and reproduced in unit 107.

Of course, it should be obvious that any one of the individual circuits in either the video or audio channel may be arranged to be normally inoperative in order that it may be turned on or rendered operative in response to a control potential from flip-flop 117. For example, video amplifier 95 may have a normally incomplete cathode circuit which is completed through contacts of a relay energized by flip-flop 117.

Mono-stable multivibrator 110 responds to field-drive pulses to produce gating pulses each having a duration sufficient to embrace the time interval in which the code signal and correlation signal components appear during each field-retrace interval, and thus those components are gated in by gate 111 for application to filter and rectifier units 34 and 114. Assuming that code-determining elements 36–40 in the receiver of FIGURE 2 are adjusted to the same settings as their counterparts 36–40 in the transmitter, blocking oscillator 25 and multivibrators 26 and 28 in the receiver operate in synchronism with the corresponding units in the transmitter.

Gates 40–43 and blocking oscillator 25 in the receiver apply pulses to the multivibrators 26 and 28 in precise time coincidence with the application of the actuating pulses to the corresponding multivibrators in the transmitter. In this way, the rectangular shaped control signal developed in the output of multivibrator 28 and used for actuating video decoder 96 has a wave form identical to the wave form applied to video coder 11. Moreover, oscillator 25 in the receiver is likewise reset to produce a pulse in time coincidence with pulse 80.

In order to make a determination as to the correctness of the settings of code-determining elements 36–40 in the receiver, namely to determine if in fact the subscriber has actually adjusted his decoding apparatus properly, correlator flip-flop 117 responds to the leading edge of each field-drive pulse to actuate to a predetermined one of its conditions. For convenience this will be called the reset, reference or first condition. When in its reset or first condition, the potential developed at the output of flip-flop 117 is of such polarity and magnitude that decoders 106 and 96 are established in their normally inoperative positions. During the particular field-retrace interval under consideration, filter and rectifier unit 114 responds to the $f_6$ correlation burst of curve M to produce a rectified envelope for gating in line-drive pulse 83, as shown by curve N, to one input of comparator or normally-closed gate 116. Meanwhile, the output pulses of curve B from blocking oscillator 25 in the receiver are applied to gate 116. Since the free count pulse 82 of curve B occurs in precise time coincidence with line-drive pulse 83 of curve N, pulse 83 is produced in the output of comparison circuit or gate 116 for actuating correlator flip-flop 117 from its first operating condition to its other or second operating condition.

The output wave form of flip-flop 117 is shown by curve P. The first amplitude excursion in curve P is, of course, caused by the action of the field-drive pulse of curve D, whereas the second amplitude excursion of wave form P results from the effect of pulse 83. Since the correlation signal component 83 occurs in exact time coincidence with pulse 82 it has now been determined that the correlation status is such that both audio and video decoding should be permitted. Consequently, triggering flip-flop 117 out of its first to its second operating condition provides a control potential at the output of the flip-flop of appropriate magnitude and polarity to render the audio and video decoders operative. At the same time, use meter 119 may be actuated to record the fact that the subscriber is subscribing to the program. Of course, the incorporation of recording device 119 is optional. By providing an indication that the subscriber is unscrambling a telecast, meter 119 may be made to record or register that fact on a tape or other recording medium for charging purposes.

Thus, the receiver of FIGURE 2 is capable of making a correlation test to determine if adjustable code-determining elements 36–40 in the receiver have been adjusted in accordance with the code schedule of the received telecast. The code schedule, as mentioned before, is the timing pattern of the mode changes of the scrambled video signal. The mode-changing pattern or code schedule of the transmitted video signal is, of course, determined in part by the setting of the code-determining elements at the transmitter and in part by the random aspect of the code signal components.

If a subscriber to the subscription television service has a receiver like that shown in FIGURE 2 but has not subscribed to the program under consideration, the adjustment of code-determining elements 36–40 at that receiver will not correspond to the adjustment of elements 36–40 at the transmitter. Consequently, blocking oscillator 25 at the receiver will not be operated in precise synchronism with the oscillator 25 in the transmitter. Thus, at the instant of correlation component 83 of curve N, oscillator 25 will not produce the pulse required to actuate correlator flip-flop 117 from its first to its second operating condition.

It should be apparent that by purposely establishing multi-condition mechanism 117 in its first or reference operating condition which indicates incorrect correlation between the code schedule of the received television signal and the instantaneous adjustment of the code-determining elements, it is essential that (1) a correlation signal component be present, and (2) the code-determining elements be properly adjusted, before flip-flop 117 is caused to assume its second operating condition which indicates correct correlation. The arrangement of the present invention therefore effectively makes two tests. Firstly, it determines whether correlation signal components are being received, and if so, it determines whether the adjustment of code-determining elements 36–40 is correlated with the timing of the correlation signal components. Thus, there is no opportunity for a representation in the receiver of correct correlation when in fact no correlation signal components exist. Consequently, in a system wherein use meter 119 is actuated to record a charge any time multi-condition mechanism 117 is in its second operating condition, unfair charges will not be assessed or recorded if the subscriber tunes his television set away from the subscription channel to a regular free television program during the broadcast of a subscription program to which he has subscribed. As soon as the television set is tuned away from the subscription channel, correlation signal components are no longer received. There is therefore no way for correlator flip-flop 117 to be actuated to its second operating condition.

Moreover, in an arrangement wherein the $f_6$ correlation bursts are channeled through one of code-determining elements 36–40 and a stationary contact of each one of the elements is grounded, manipulating the switches in an attempt to pirate a given television program so that the correlation bursts are effectively "thrown away" via the ground position, does not result in unauthorized operation of audio decoder 106 as there is no opportunity for correlator flip-flop 117 to be "locked" in its second operating condition, thus representing correct correlation. If the correlation signal components are effectively removed from the input of comparator 116, multi-condition mechanism 117, once actuated to its reset or first condition, receives no actuating pulse which is essential before it can assume its second operating condition. This feature, of course, bears no relationship to possible inequitable charges and is exhibited by the described system whether or not there is a use meter.

It is appreciated that during the time interval embraced by the two amplitude excursions of wave form P decoders 106 and 96 are permitted to fall back to their normally inoperative or non-translating conditions. This may possibly introduce undesirable transients in the video and/or audio signals. Since the time interval between the leading edge of a field-drive pulse and a correlation component is relatively short (in the illustrated example it is eleven line traces in duration), appropriate time constants may be introduced in the system so that the decoders are maintained in their operative conditions during that interval. For example, when the video channel is disabled by employing a normally incomplete cathode circuit which is closed by action of a relay, that relay may be made to have a certain degree of inertia so that once energized it does not become de-energized during the short interval like that illustrated in wave form P.

To summarize the invention as embodied in the receiver of FIGURE 2, a secrecy communication receiver is provided which utilizes an intelligence signal (specifically a video signal) coded in accordance with a given code schedule. Blocking oscillator 25, multivibrators 26 and 28, differentiator 29, video decoder 96 and all of the actuating circuitry for these units collectively may be considered decoding apparatus including a plurality of adjustable code-determining elements 36–40 to be adjusted relative to one another in accordance with a pattern dictated by the given code schedule in order to achieve decoding of the intelligence or video signal. Correlator flip-flop 117 constitutes a multi-condition mechanism having first and second operating conditions respectively indicating incorrect and correct correlations between the given code schedule and the instantaneous adjustment of code-determining elements 36–40. Synchronizing signal separator 100 and the coupling circuitry to one of the inputs of flip-flop 117 may be considered means for actuating multi-condition mechanism 117 to its first operating condition. Specifically, establishment of flip-flop 117 in its first condition is achieved by the field-drive pulses like the one shown in curve D. Normally-closed gates 116 and 115, and $f_6$ filter and rectifier 114 constitute means for subsequently actuating multi-condition mechanism 117 from its first to its second operating condition if there is correct correlation between the given code schedule and the instantaneous adjustment of the code-determining elements. A control effect, namely the output signal of curve P, is derived from flip-flop 117 and is utilized by decoders 96 and 106, and use meter 119.

The decoding apparatus is selectively operable in one of at least two different operating states as determined, at least partially, by the instantaneous adjustment of the code-determining elements. Since the timing of the periodically recurring pulses from blocking oscillator 25 may exhibit any one of five different phase conditions, the system may effectively be established in any one of five different operating states. The phase condition of the output pulses of oscillator 25, namely the operating state in which the system is established, is determined by the random manner in which oscillator 25 is reset during a state-determining interval, and since reset is controlled by the output of bi-stable multivibrator 28, the operating state is determined in part by code signal components $f_1$–$f_5$ and in part by the particular setting at that time of code-determining elements 36–40.

The combination of the periodically recurring line-drive pulses of curve A and the random code and correlation components of curve M may be considered an encoding signal having a characteristic effectively representing the code schedule of the telecast. A portion of this encoding signal, namely the line-drive pulses and the code signal bursts of frequencies $f_1$–$f_5$, are applied to the decoding apparatus for at least partially controlling the actuation of blocking oscillator 25. The operating state established by blocking oscillator 25 is, of course, determined at least partially by the effect of the code bursts.

In the embodiment of FIGURE 2, the correlation test is effected by comparing the wave form of the output of blocking oscillator 25 with that of the correlation signal component. However, it should be appreciated that the invention may be practiced in a system of the type disclosed in the copending Roschke application Serial No. 823,463, wherein the correlation signal component is compared with the output of a bi-stable multivibrator which is essentially the counterpart of multivibrator 28. In that application, a correlation signal burst is conveyed to a subscriber receiver during a field-retrace interval only if the bi-stable multivibrator is established, during the occurrence of that burst, in a predetermined one of its two operating conditions. In practicing the present invention, it is desirable that a correlation signal burst be transmitted during every state-determining portion of a field-retrace interval. Otherwise, it is possible that even in a correctly correlated receiver the correlator flip-flop will be established in its condition indicating incorrect correlation for intervals lasting at least one full field-trace due to the fact that the flip-flop is purposely reset to that condition during every field-retrace interval.

Accordingly, to employ the teachings of the present invention in the Roschke system of copending application Serial No. 823,463, it is preferable that a correlation burst be generated and transmitted during every state-determining interval. The transmitter of FIGURE 4 has been constructed to achieve that objective.

The circuitry shown in FIGURE 4 illustrates only that much of the transmitter of FIGURE 1 requiring modification. A 7:1 blocking oscillator 120 has its input circuit connected to synchronizing signal generator 20 to receive line-drive pulses therefrom and its output circuit connected to the common or counting input of a single bistable multivibrator 121, the output of which is coupled to the deflection electrodes of video coder 11. The output terminals of multivibrator 121 are also coupled through a differentiating circuit 122 to the reset input of blocking oscillator 120. Units 120–122 essentially function in identical manner to units 25–29 of the transmitter of FIGURE 1. Blocking oscillator 120 and multivibrator 121 together constitute a counting mechanism which, in response to periodically recurring line-drive pulses, produces a square wave shaped control signal having amplitude excursions occurring every seven successive line traces because of the total 14:1 counting ratio. The cyclic operation of this counting chain is disrupted by the code components which actuate gates 40–42, since the outputs of those gates are respectively connected to three inputs of multivibrator 121.

The selected line-drive pulses translated from gate 40 to multivibrator 121 establish it in a predetermined one of its operating conditions if it isn't already there, line-drive pulses gated in to the multivibrator by gate 42 trigger it to its other stable operating condition if it isn't already there, and selected line-drive pulses applied to multivibrator 121 from the output of gate 41 actuate it from its instantaneous condition, whatever one that may be, to its opposite condition. Gate 43 in FIGURE 1 may be eliminated entirely and the stationary contact on the extreme right of each of switches 36–40 may be connected to ground. In this way, the code-determining elements may be adjusted so that one or more of the code components may be "thrown away" or rendered ineffective.

A mono-stable multivibrator 125 is connected to generator 20 to receive field-drive pulses therefrom and is so constructed that it actuates from its normal to its abnormal condition in response to the leading edge of each field-drive pulse and remains there for six complete line-trace intervals. The output of multivibrator 125 is connected to the input of a mono-stable multivibrator 126, the parameters of which are so chosen that it actuates to its abnormal condition in response to the trailing edge of each output pulse from multivibrator 125, in which condition it remains for ten complete line traces. The output of multivibrator 126 is connected to one input of a normally-closed gate circuit 127, another input of which is coupled to the output of bi-stable multivibrator 121. The output of gate 127 is connected through a differentiator and positive clipper 129 to the input of a mono-stable multivibrator 130. This multivibrator actuates, in response to a differentiated output pulse or "spike" from unit 129, to its abnormal condition, from which it does not return to its normal condition for ten complete line-trace intervals. The output of multivibrator 130 is connected to the input of another mono-stable multivibrator 132 which is triggered to its abnormal condition in response to the leading edge of an output pulse from multivibrator 130 and remains there for only one full line-trace interval. The output of unit 132 is connected to the input of a normally-closed gate circuit 134, another input of which is connected to signal generator 62 which, as mentioned before, continuously produces a sinusoidal signal of frequency $f_6$. The output of gate 134 is connected to one input of mixer 64.

Random code signal generator 30 is connected to one input of an AND gate 136, another input of which is connected to the output of multivibrator 132. A third input of AND gate 136 is connected to the output of a mono-stable multivibrator 137, the input of which is connected in turn to the output of 7:1 blocking oscillator 120. Multivibrator 137 is designed such that it assumes, in response to each free count output pulse from oscillator 120, its abnormal condition for five complete line traces. The output of AND gate 136 is connected to filter and rectifier units 34 and also to another input of mixer 64, the output of the mixer being connected to mixer amplifier 13. AND gate 136 is so constructed that it is rendered closed whenever the output potential of multivibrator 137 is established at its minimum level or is negative with respect to its AC axis, or whenever the output potential of multivibrator 132 is at its maximum level or is positive with respect to its AC axis.

In describing the operation of the transmitter of FIGURE 4, attention is invited to the idealized signal wave forms of FIGURE 10 which are found at various points in the transmitter as illustrated by the encircled letter indicia. The line-drive and field-drive pulses of curves A and D of FIGURE 3 have been reproduced in FIGURE 10 for convenience. Blocking oscillator 120 responds to the line-drive pulses of curve A to produce at its output the pulses of curve Q. It will be noted that the first three pulses of curve Q (starting from the left) appear at intervals of seven line-trace intervals, and thus these are all free count pulses. Pulses 140 and 141 of curve Q, on the other hand, essentially occur at random as a result of the feedback signal through differentiator 122 from the output of multivibrator 121.

It will be assumed that in the transmitter of FIGURE 4, ten rather than six line-trace intervals or "slots" are employed in supplying code components to multivibrator 121 via gates 40–42. Of course, it is a relatively simple matter to modify random code signal generator 30 in order that a combination or group of up to ten code signal bursts are developed during the state-determining portion of each field-retrace interval. It will be noted that in copending application Serial No. 829,106, filed July 23, 1959, in the name of Richard C. Herrmann et al., and assigned to the present assignee, ten successive line traces or "slots" are devoted to the random actuation of the coding apparatus. Consequently, it will be noted that the state-determining interval in FIGURE 10 endures for ten line traces.

Bi-stable multivibrator 121 actuates in response to the pulses of curve Q to provide the rectangular shaped signal of wave form R for application to video coder 11. Of course, the random amplitude excursions of the signal of curve R during the state-determining interval result from the code components actuating gates 40–42 and also from free count pulse 144 of curve Q. In comparing wave forms Q and R it will be noted that reset pulses 140 and 141 are developed when the output potential of multivibrator 121 varies from its maximum to its minimum level. Of course, it has been assumed that differentiator 122 resets blocking oscillator 120 when multivibrator 121 changes operating conditions such that a negative amplitude excursion is produced in waveform R. For convenience, the two conditions of multivibrator 121 may be designated "positive" and "negative," the positive condition prevailing when wave form R is established at its maximum potential level or is positive with respect to its AC axis, and the negative condition prevailing when wave form R is established at its minimum potential level or is negative with respect to its AC axis.

Mono-stable multivibrator 125 responds to the leading edge of the field-drive pulse shown in curve D and produces the pulse of curve S, the trailing edge of which actuates mono-stable multivibrator 126 which in turn produces the pulse of curve T to provide a gating signal for turning on normally-closed gate 127, to which gate is also supplied the signal of curve R. Consequently, the amplitude excursions of wave form R occurring during the state-determining interval are effectively separated out from the remaining amplitude excursions, as shown by wave form U appearing in the output of gate 127. Differentiator and positive clipper 129 differentiates the signal of curve U and selects only the positive differentiated pulses, as shown by curve V, for application to mono-stable multivibrator 130, which responds to the first such pulse of curve V to produce the pulse of wave form W. Mono-stable multivibrator 132 responds to the leading edge of the pulse of curve W to produce the positive gating pulse of wave form X for opening gate 134 during the entire line-trace interval embraced by curve X. The burst of $f_6$ frequency shown by curve Y is consequently developed in the output of gate 134.

In observing the wave forms of FIGURE 10, it should be apparent that the $f_6$ correlation burst of curve Y occupies the first line-trace interval during the state-determining interval in which multivibrator 121 is established in its positive condition. With such an arrangement, the correlation component of curve Y may be employed in a receiver to gate in line-drive pulse 146 of curve A to a comparator in order to determine if a multivibrator corresponding to multivibrator 121 is also established in its positive condition at the instant defined by pulse 146. In order to make certain that multivibrator 121 remains in its positive condition for at least two line traces the first time it is established in that condition during a state-determining interval so that it does not change operating conditions during the instant of line-drive pulse 146, the positive pulse of curve X is employed to inhibit the output of code signal generator 30. AND gate 136 is closed during the time interval embraced by the positive pulse of curve X in order that no code burst is developed at that time. In this way, a line-drive pulse is not gated in to multivibrator 121 through one of gates 40–42 during the occurrence of pulse 146.

It is also essential to make certain that the first positive amplitude excursion of wave form R during a state-determining interval does not occur one line trace previous to a free count output of blocking oscillator 120. If multivibrator 121 were permitted to assume its positive condition for only one line trace immediately preceding a free count, at the instant of the correlation test at a receiver the multivibrator corresponding to 121 would be undergoing a change in operating conditions, obviously rendering an accurate comparison extremely difficult if not impossible. In other words, if free count pulse 144 happened to occur one line trace earlier (namely, in time coincidence with line-drive pulse 146), wave form R would undergo an amplitude change from positive to negative at that instant even though the code signal bursts have been inhibited by the pulse of curve X. A correlation test at the instant of pulse 146 would therefore not be feasible or desirable.

To preclude this possibility, the output of random code signal generator 30 is additionally inhibited during the two line traces immediately preceding the first free count output of blocking oscillator 120 during a state-determining interval. This is achieved by actuating mono-stable multivibrator 137 in response to the pulses of curve Q in order to provide the signal of wave form Z for application to AND gate 136. Multivibrator 137 responds to each free count pulse of blocking oscillator 120 and assumes its abnormal condition for five complete line-trace intervals. Consequently, negative pulse components two line traces in duration appear in curve Z and precede each free count of curve Q. AND gate 136 is closed in response to each negative pulse component of wave form Z. Thus, negative pulse 147 of curve Z inhibits the output of generator 30 during the two line traces preceding free count 144.

The code signal bursts of wave form AA constitute a typical combination that may be generated during a state-determining interval. It will be noted that because of the inhibiting effect of pulse 147, no code bursts occur at that time. The code signal bursts of wave form AA are applied to mixer 64 along with the correlation burst of curve Y for subsequent application to mixer amplifier 13. The bursts of curve AA also, of course, are applied to filter and rectifier units 34 to eventually control the application of actuating pulses to multivibrator 121 via gates 40–42.

FIGURE 5 represents a modification of the receiver of FIGURE 2 in order that the television transmission from the transmitter of FIGURE 4 may be decoded. Additionally, the receiver of FIGURE 5 effects a correlation test in accordance with another embodiment of the invention. Units 120–122 in the receiver of FIGURE 5 operate identically to the correspondingly numbered units in the transmitter of FIGURE 4 to effect decoding of the coded video signal if code-determining elements 36–40 are correctly positioned. Additionally, a normally-closed gate 150 has one input connected to the output of $f_6$ filter and rectifier 114 and another input to line-sweep system 102 to receive therefrom $f_6$ rectified envelopes and line-drive pulses, respectively. The output of gate 150 is connected to one input of a comparator in the form of a normally-closed gate 151, and also to one input of a correlator flip-flop or multi-condition mechanism 154. That same input of flip-flop 154 is connected to separator 100 to receive field-drive pulses therefrom. Another input of gate 151 is coupled to the output of multivibrator 121, and the output of gate 151 is connected to a normally-closed electronic switching device in the form of a normally-inoperative blocking oscillator 155. The series combination of a resistor 156 and an energy storage device in the form of a condenser 157 is connected between a source of positive unidirectional potential 158 and ground. The junction of resistor 156 and condenser 157, labeled 160, is connected to blocking oscillator 155 and also to another input of correlator flip-flop 154. The output of flip-flop or multi-condition mechanism 154 is connected to decoders 96 and 106, and use meter 119.

In describing the operation of the receiver of FIGURE 5 attention is also directed to the wave forms of FIGURE 10. If code-determining element 36–40 at the receiver are correctly positioned for a program coded in accordance with the signal of curve R, video unscrambling is, of course, achieved. In the absence of energization or "firing" of normally-inoperative blocking oscillator 155, condenser 157 charges to and assumes the positive potential of source 158. However, flip-flop 154 is so constructed that a positive potential of that level applied thereto from junction 160 has no effect.

Correlator flip-flop 154 corresponds to flip-flop 117 in the receiver of FIGURE 2. In response to the leading edge of the positive field-drive pulse shown in curve D, flip-flop 154 is triggered to its first operating condition which indicates incorrect correlation between the code schedule of the telecast, and the instantaneous adjustment of the code-determining elements. Wave form DD illustrates the signal developed in the output of flip-flop 154. Subsequent to the reset actuation of the flip-flop, $f_6$ filter and rectifier 114 produces, from the $f_6$ correlation burst of curve Y, the rectified envelope of wave form BB which opens gate 150 during the instant of line-drive pulse 146. Consequently, pulse 146 is gated in, with negative polarity as shown by wave form CC, to the same input of correlator flip-flop 154 as that to which the positive field-drive pulse of curve D was applied. The negative pulse of curve CC is effective to trigger flip-flop 154 from its first to its second operating condition as shown by wave form DD. Flip-flop 154 is therefore established in its condition representing correct correlation and decoders 96 and 106, and use meter 119 are in turn actuated.

When the receiver of FIGURE 5 is properly correlated, normally-closed gate 151, blocking oscillator 155 and circuit elements 156–160 serve no purpose. This obtains because normally-closed gate or comparator 151 is only established in its translating condition when multivibrator 121 is established in its negative condition. For a properly correlated receiver, pulse 146, of course, occurs only when multivibrator 121 is in its positive condition. Thus, in a properly correlated receiver no signal is developed in the output of gate 151. When the correlation is incorrect, however, the negative pulse of curve CC is gated into switching device or blocking oscillator 155, triggering it into oscillation and thereby effectively shunting junction 160 to ground. Turning blocking oscillator 155 on completes a discharge path through the oscillator, and condenser 157 discharges therethrough relatively instantaneously.

Reducing the potential level at junction 160 substantially to ground is sufficient to trigger correlator flip-flop 154 to its first operating condition. As a practical matter, because of the inherent delays introduced by units 151, and 155–160, the negative-going pulse developed at junction 160 when there is incorrect correlation slightly follows the pulse of curve CC. Consequently, multi-condition mechanism 154 is initially triggered to its second operating condition by the pulse of curve CC but is then almost instantaneously triggered back to its first operating condition by the potential drop at junction 160, which condition of course represents an incorrect correlation status.

By establishing the time constant of the charging circuit, including resistor 156, for condenser 157 such that it is relatively long with respect to the intervals between successive field-drive pulses, several field-trace intervals of correct correlation will be necessary before condenser 157 charges up to a positive potential sufficient to preclude the triggering of flip-flop 154 back to its first condition. Consequently, the embodiment of FIGURE 5 has the added advantage over that of FIGURE 2 in that the correlator flip-flop is established in its first condition relatively instantaneously when there is incorrect correlation, and yet many fields of correct correlation are necessary before decoders 106 and 96 are placed into operation. This, of course, discourages the manipulation of the code-determining elements by an unauthorized person in attempting to reach the correct switch setting pattern by trial and error.

It will be noted that there is another principal difference between the embodiments of FIGURES 2 and 5. In the arrangement of FIGURE 2, the correlator flip-flop is only actuated from its first to its second condition when there is correct correlation. In FIGURE 5, on the other hand, correlator flip-flop 154 is initially established in its second operating condition by the pulse of curve CC whether the correlation is correct or not. The flip-flop is then subsequently established in its first operating condition by the potential at junction 160 if incorrect correlation exists between the code schedule of the scrambled video and the instantaneous adjustment of the code-determining elements.

In discussing the operation of the transmitter of FIGURE 4, it was explained that mono-stable multivibrator 137 is desirable in order that no code signal bursts are transmitted during the two complete line traces preceding the first free count output pulse of oscillator 120 in a state-determining interval. In this way, a free count pulse is never generated in the line-retrace interval immediately succeeding the occurrence of an $f_6$ correlation burst. The transmitter of FIGURE 6 is very similar to that shown in FIGURE 4 and attacks the problem raised by the free count pulses of blocking oscillator 120 in a completely different manner. In FIGURE 6, a normally-open gate 165 is interposed between blocking oscillator 120 and bi-stable multivibrator 121. The output of normally-closed gate 134 is additionally coupled through a filter and rectifier 166 to another input of gate 165. AND gate 136 of FIGURE 4 is replaced in FIG- URE 6 by a normally-open gate 167 since mono-stable multivibrator 137 is no longer required.

The transmitter of FIGURE 6 functions in generally the same manner as that shown in FIGURE 4, with the exception that if a free count pulse is developed in the output of blocking oscillator 120 during the line-retrace interval immediately succeeding an $f_6$ correlation burst, that pulse is effectively "locked out" or rendered ineffective. Assume that in the wave forms of FIGURE 10 blocking oscillator 120 produces a free count pulse in time coincidence with line-drive pulse 146. Such a free count pulse is effectively blocked by gate 165 since filter and rectifier 166 responds to the $f_6$ correlation burst of wave form Y to supply a rectified envelope of the type shown in curve BB for closing gate 165. Consequently, bi-stable multivibrator 121 always remains in its instantaneous operating condition for at least one line-trace interval succeeding the termination of a correlation signal burst, since there is a complete absence of actuating pulses applied to the multivibrator at that time. Gate 165 locks out any free count pulse from blocking oscillator 120, and the output of multivibrator 132 closes normally-open gate 167 to inhibit any code bursts occurring during the $f_6$ burst so that multivibrator 121 does not receive any actuating pulses via gates 40–42.

FIGURE 7 represents a portion of the receiver of FIGURE 5 modified to respond to the signal transmitted from the transmitter of FIGURE 6, and illustrates another embodiment of the invention. As in the case of FIGURE 6, a normally-open gate 165 is interposed between oscillator 120 and multivibrator 121 in the receiver of FIGURE 7. Gate 165 is controlled by the output of $f_6$ filter and rectifier 114. For a properly correlated receiver, the output signal of unit 114 is identical in wave shape and phase to the output signal of filter and rectifier 166 of FIGURE 6. Consequently, the circuitry shown in FIGURE 7 functions in identical manner to the corresponding circuitry in the transmitter of FIGURE 6.

FIGURE 8 shows a portion of the receiver of FIGURE 5 modified in accordance with still another embodiment of the invention. In a sense, the arrangement of FIGURE 8 constitutes a combination of features shown in FIGURES 2 and 5. In FIGURE 5, the output of bi-stable multivibrator 121 is compared with the correlation signal component developed in the output of gate 150. Such a comparison is also made in the receiver of FIGURE 8 by means of a normally-closed gate 168. However, gate 168 is not a direct counterpart of gate 151 in FIGURE 5 since gate 168 produces an output pulse only when there is correct correlation, whereas gate 151 produced an output pulse only during intervals of incorrect correlation. Thus, normally-closed gate or comparison device 168 is similar to gate 116 in FIGURE 2. The output of gate 168 is coupled to one input of a correlator flip-flop 167, another input of which is connected to separator 100 to derive field-drive pulses therefrom. Gate 168 and flip-flop 167 operate in identical manner as gate 116 and flip-flop 117 in the arrangement of FIGURE 2. In other words, in response to each field-drive pulse correlator flip-flop 167 is purposely reset to its first operating condition representing incorrect correlation, and then a correlation test is subsequently made in gate 168. If it is determined that the correlation is correct, correlator flip-flop 167 is actuated to its second operating condition.

It has been stressed that one of the salient features of the invention resides in purposely establishing the multi-condition mechanism or correlator flip-flop in its first operating condition so that an indication of correct correlation is not manifest unless, as a result of a correlation test, it is determined that there is in fact a correlation signal component, and that, moreover, the adjustment of the code-determining elements is correlated to the timing of that component. It, of course, should be appreciated that the multi-condition correlation mechanism may be reset to its first operating condition without the need of external actuating circuitry. In other words, the means for actuating the multi-condition mechanism to its first operating condition may actually be included as a part of the mechanism itself in the form of circuitry that automatically establishes the correlator mechanism in a fixed condition. Such an arrangement is shown in the embodiment of FIGURE 9.

This figure illustrates the receiver of FIGURE 8 modified to eliminate the need of coupling circuitry to the separator. A correlator mono-stable or single-trip multivibrator 170 is effectively substituted for correlator flip-flop 167. Gate 168 produces an output pulse during the state-determining portion of every field-retrace interval when correct correlation prevails, and mono-stable multivibrator 170 responds to each of these pulses to assume its abnormal operating condition for an interval slightly less than a complete field-trace interval. With this arrangement, multi-condition mechanism 170 automatically falls back to its normal or reset condition at some instant preceding each correlation test. Thus, immediately preceding each test correlator mono-stable multivibrator 170 is found in its first or normal operating condition indicating incorrect correlation but upon actuation by a pulse from gate 168 unit 170 assumes its second or abnormal operating condition, in which it remains for an interval slightly less than a field-trace interval. Unit 170 could also, of course, take the form of a blocking oscillator which would reset itself after an interval of a predetermined duration.

The invention provides, therefore, a correlation testing arrangement which does not provide an indication of correct correlation unless an actual correlation test finds that correct correlation does in fact exist.

Certain features described in the present application are disclosed and claimed in copending application Serial No. 26,550, filed concurrently herewith, in the name of Melvin C. Hendrickson, and assigned to the present assignee.

While particular embodiments of the invention have been shown and described, modifications may be made, and it is intended in the appended claims to cover all such modifications as may fall within the true spirit and scope of the invention.

I claim:

1. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for actuating said multi-condition mechanism to its first operating condition; means, responsive to a condition of correct correlation between said given code schedule and the instantaneous adjustment of said code-determining elements, for subsequently actuating said mechanism from its first to its second operating conditions; and means for deriving from said mechanism a control effect indicating the correlation status.

2. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for actuating said multi-condition mechanism during a predetermined interval to its first operating condition; means for comparing the instantaneous adjustment of said code-determining elements with said given code schedule to determine the condition of correlation therebetween, and for actuating said mechanism during an interval, subsequent to said predetermined interval, to its second operating condition only in response to a predetermined condition of correlation between said given code schedule and the instantaneous adjustment of said code-determining elements; and means for deriving from said mechanism a control effect indicating the correlation status.

3. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and selectively operable to one of at least two different operating states as determined partially by the instantaneous adjustment of said code-determining elements; a multi-condition mechanism having first and second operating conditions respectively indicating incorrect and correct conditions of correlation between said given code schedule and the instantaneous adjustment of said code-determining elements; means for actuating said multi-condition mechanism during predetermined intervals to its first operating condition; means for comparing the instantaneous adjustment of said code-determining elements, as reflected by the operating state of said apparatus, with said given code schedule during particular intervals; means coupled to said comparing means for actuating said multi-condition mechanism during an interval, subsequent to each said predetermined interval, to its second operating condition only if there is correct correlation between said given code schedule and the instantaneous adjustment of said code-determining elements; and means for deriving from said mechanism a control effect indicating the correlation status.

4. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for actuating said multi-condition mechanism during a predetermined interval to its first operating condition; means for deriving a correlation signal related to said given code schedule; means responsive to said correlation signal and to a signal from said decoding apparatus for determining if there is correct correlation between said given code schedule and the instantaneous adjustment of said code-determining elements, and for actuating said mechanism during an interval, subsequent to said predetermined interval, to its second operating condition if there is correct correlation; and means for deriving from said mechanism a control effect indicating the correlation status.

5. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and responsive to an applied signal for assuming a selected one of at least two operating states, the selected state being determined conjointly by the instantaneous adjustment of said code-determining elements and the applied signal; means for deriving an encoding signal having a characteristic representing said given code schedule; means for applying a portion of said encoding signal to said decoding apparatus for partially controlling the instantaneous operating state thereof; a multi-condition mechanism having first and second operating conditions respectively indicating incorrect and correct conditions of correlation between said given code schedule and the instantaneous adjustment of said code-determining elements; means for actuating said multi-condition mechanism during a predetermined interval to its first operating condition; means responsive to a portion of said encoding signal and to a signal from said decoding apparatus for examining the instantaneous operating state of said decoding apparatus during a particular interval, determined by said given code schedule, to determine if said decoding apparatus is actually established at that time in a predetermined operating state, and for actuating said multi-condition mechanism during an interval, subsequent to said predetermined interval, to its second operating condition if there is correct correlation between said given code schedule and the instantaneous adjustment of said code-determining elements; and means for deriving from said mechanism a control effect indicating the correlation status.

6. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct correlations between said given code schedule and the instantaneous adjustment of said code-determining elements; means for actuating said multi-condition mechanism during a predetermined interval to its first operating condition; means for developing a first comparison signal having a wave form during a particular interval determined by the instantaneous adjustment of said code-determining elements and for developing a second comparison signal having a wave form determined by said given code schedule; means responsive to said comparison signals for determining the condition of correlation between said given code schedule and the instantaneous adjustment of said code-determining elements, and for actuating said multi-condition mechanism during an interval, subsequent to said predetermined interval, to its second operating condition if there is correct correlation; and means for deriving from said mechanism a control effect indicating the correlation status.

7. A secrecy communication receiver for utilizing an intelligence signal coded in accordance with a given code schedule and also an encoding signal including correlation components related to said code schedule, said receiver comprising: decoding apparatus including a plurality of adjustable code-determining elements to be adjusted relative to one another in accordance with a pattern dictated by said given code schedule in order to achieve decoding of said intelligence signal; means for applying said encoding signal to said decoding apparatus for partially controlling the operation thereof; a multi-condition mechanism having first and second operating conditions respectively indicating incorrect and correct conditions of correlation between said given code schedule and the instantaneous adjustment of said code-determining elements; means for actuating said multi-condition mechanism during a predetermined interval to its first operating condition; means responsive to said correlation components for determining if there is correct correlation between said given code schedule and the instantaneous adjustment of said code-determining elements, and for actuating said multi-condition mechanism during an interval, subsequent to said predetermined interval, to its second operating condition if there is correct correlation; and means for deriving from said mechanism a control effect indicating the correlation status.

8. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements, said mechanism normally being established in its first operating condition; means for actuating said multi-condition mechanism from its first to its second operating condition only in the presence of a correct condition of correlation between said given code schedule and the instantaneous adjustment of said code-determining elements; and means for deriving from said mechanism a control effect indicating the correlation status.

9. A subscription television receiver for utilizing a television signal, including field-synchronizing components, coded in accordance with a given code schedule, said receiver comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for utilizing each of said field-synchronizing components to actuate said multi-condition mechanism to its first operating condition; means for actuating said multi-condition mechanism, subsequent to each of said field-synchronizing components, from its first to its second operating condition only in the presence of a correct condition of correlation between said given code schedule and the instantaneous adjustment of said code-determining elements; and means for deriving from said mechanism a control effect indicating the correlation status.

10. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for establishing said multi-condition mechanism in its first operating condition; means for subsequently establishing and maintaining said multi-condition mechanism in its second operating condition in the presence of a correct condition of correlation between said given code schedule and the instantaneous adjustment of said code-determining elements; and means for deriving from said mechanism a control effect indicating the correlation status.

11. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for establishing said multi-condition mechanism, from time to time during spaced intervals, in its first operating condition; means for establishing and maintaining said multi-condition mechanism in its second operating condition for substantially each of the time intervals intervening said spaced intervals only in the presence of a correct condition of correlation between said given code schedule and the instantaneous adjustment of said code-determining elements; and means for deriving from said mechanism a control effect indicating the correlation status.

12. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for establishing said multi-condition mechanism in its said second operating condition; means for subsequently establishing said multi-condition mechanism in its first operating condition if there is an incorrect correlation between said given code schedule and the instantaneous adjustment of said code-determining elements; and means for deriving from said mechanism a control effect indicating the correlation status.

13. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; means for establishing said multi-condition mechanism in its second operating condition; an energy storage device coupled to said multi-condition mechanism; means including a charging circuit having a long time constant for establishing and maintaining a charge on said storage device; a normally-interrupted discharge path for said storage device having a time constant small relative to that of said charging circuit; means for effectively completing said discharge circuit if there is an incorrect correlation between said given code schedule and the instantaneous adjustment of said code-determining elements to establish said multi-condition mechanism in its first operating condition; and means for deriving from said mechanism a control effect indicating the correlation status.

14. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; a multi-condition mechanism having first and second operating conditions respectively indicating incorrect and correct conditions of correlation between said given code schedule and the instantaneous adjustment of said code-determining elements; an energy storage device coupled to said multi-condition mechanism; means including a charging circuit having a long time constant for establishing and maintaining a charge on said storage device; a normally-interrupted discharge path for said storage device having a time constant small relative to that of said charging circuit; means for actuating said multi-condition mechanism at spaced instants to its second operating condition, the intervals between actuations being small compared to the time constant of said charging circuit; means for completing said discharge circuit during each of said spaced instants only if there is an incorrect correlation between said given code schedule and the instantaneous adjustment of said code-determining elements to establish and maintain said multi-condition mechanism in its first operating condition during the intervals between said spaced instants; and means for deriving from said mechanism a control effect indicating the correlation status.

15. A secrecy communication receiver comprising a decoding apparatus which includes a plurality of adjustable code-determining elements to be adjusted relative to one another in accordance with a predetermined pattern dictated by the code schedule of a received coded intelligence signal and which is selectively operable in one of a plurality of different operating states as determined partially by the instantaneous adjustment of said code-determining elements; means actuating said decoding apparatus during each of a series of spaced state-determining intervals to establish said apparatus in different operating states during the intervening intervals; and means effecting a correlation test, for each state-determining interval, to compare the instantaneous adjustment of said code-determining elements, as reflected by the instantaneous operating state of said decoding apparatus, with the code schedule of the received intelligence signal to determine if said code-determining elements are positioned in accordance with said predetermined pattern.

16. A secrecy communication system including a transmitter for transmitting an intelligence signal coded in accordance with a given code schedule and a receiver for utilizing said intelligence signal, said system comprising: decoding apparatus in said receiver including a plurality of adjustable code-determining elements to be adjusted relative to one another in accordance with a pattern dictated by said given code schedule in order to achieve decoding of said intelligence signal and selectively operable in one of a plurality of different operating states as determined partially by the instantaneous adjustment of said code-determining elements; means for actuating said decoding apparatus during each of a series of spaced state-determining intervals to establish said apparatus in different operating states during the intervening intervals;

means in said transmitter for producing and transmitting a correlation signal component, related to said given code schedule, for each state-determining interval; and means in said receiver responsive at least partially to each said correlation signal component for testing the correlation status between said given code schedule and the instantaneous adjustment of said code-determining elements.

17. A communication receiver comprising: signal-generating apparatus, including a plurality of adjustable code-determining elements to be adjusted in accordance with a predetermined adjustment, for developing a comparison signal having a characteristic determined in part by the instantaneous adjustment of said code-determining elements; a multi-condition mechanism having first and second operating conditions respectively indicating incorrect and correct conditions of correlation between said predetermined adjustment and the instantaneous adjustment of said code-determining elements, means for actuating said multi-condition mechanism, during a predetermined interval, to its first operating conditions; means responsive to said comparison signal for comparing the instantaneous adjustment of said code-determining elements with said predetermined adjustment to determine the condition of correlation therebetween, and for actuating said mechanism during an interval, subsequent to said predetermined interval, to its second operating condition only in response to a condition of correct correlation; and means for deriving from said mechanism a control effect indicating the correlation status.

18. A communication receiver comprising: signal-generating apparatus, including a plurality of adjustable code-determining elements to be adjusted in accordance with a predetermined adjustment, for developing a comparison signal having a characteristic determined in part by the instantaneous adjustment of said code-determining elements; a multi-condition mechanism having first and second operating conditions respectively indicating incorrect and correct conditions of correlation between said predetermined adjustment and the instantaneous adjustment of said code-determining elements, said mechanism normally being established in its first operating condition; means responsive to said comparison signal for comparing the instantaneous adjustment of said code-determining elements with said predetermined adjustment to determine the condition of correlation therebetween, and for actuating said mechanism during an interval, subsequent to said predetermined interval, to its second operating condition only in response to a condition of correct correlation; and means for deriving from said mechanism a control effect indicating the correlation status.

No references cited.